(12) United States Patent
McCleer

(10) Patent No.: US 9,263,970 B2
(45) Date of Patent: Feb. 16, 2016

(54) AC BATTERY EMPLOYING MAGISTOR TECHNOLOGY

(71) Applicant: Magistor Technologies, L.L.C., Bloomfield Hills, MI (US)

(72) Inventor: Patrick J. McCleer, Holland, MI (US)

(73) Assignee: Magistor Technologies, L.L.C., Bloomfield Hills, MI (US)

(*) Notice: Subject to any disclaimer, the term of this patent is extended or adjusted under 35 U.S.C. 154(b) by 105 days.

(21) Appl. No.: 14/256,248

(22) Filed: Apr. 18, 2014

(65) Prior Publication Data
US 2014/0265588 A1 Sep. 18, 2014

Related U.S. Application Data

(63) Continuation-in-part of application No. 13/103,932, filed on May 9, 2011, now abandoned.

(51) Int. Cl.
*H02M 1/00* (2007.01)
*H02J 7/00* (2006.01)
*H02M 7/5387* (2007.01)
*H02M 3/28* (2006.01)
*H02M 3/335* (2006.01)
*H02M 7/217* (2006.01)
*H02M 7/5395* (2006.01)
*H02M 7/49* (2007.01)

(52) U.S. Cl.
CPC ......... *H02M 7/53871* (2013.01); *H02J 7/0065* (2013.01); *H02M 3/285* (2013.01); *H02M 3/33592* (2013.01); *H02M 7/2173* (2013.01); *H02M 7/49* (2013.01); *H02M 7/5387* (2013.01); *H02M 7/5395* (2013.01); *H02M 2001/007* (2013.01); *H02M 2001/0083* (2013.01); *Y02B 40/90* (2013.01); *Y02B 70/1475* (2013.01); *Y10T 307/549* (2015.04)

(58) Field of Classification Search
USPC ............... 363/97, 98, 131, 132, 21.06, 21.14, 363/52–54, 84–85, 125, 127, 128, 17, 65, 363/71, 73, 74
See application file for complete search history.

(56) References Cited

U.S. PATENT DOCUMENTS 6,031,737 A * 2/2000 Green .................. H02M 3/337 363/131
7,139,180 B1 * 11/2006 Herbert ................. H02M 1/42 363/124

* cited by examiner

*Primary Examiner* — Timothy J Dole
*Assistant Examiner* — Bryan R Perez
(74) *Attorney, Agent, or Firm* — Felix L. Fischer

(57) ABSTRACT

A DC/AC converter incorporates at least one Magistor module having a first sp control switch, a second sz control switch and a third sm control switch. An AC source is connected to an input of the at least one Magistor module. A switch controller connected to the first sp control switch, second sz control switch and third sm control switch to and provides pulse width modulation (PWM) activation of the switches for controlled voltage at an output.

15 Claims, 26 Drawing Sheets

Quadrant 2, io=+Iom>0, avg(vo)<0

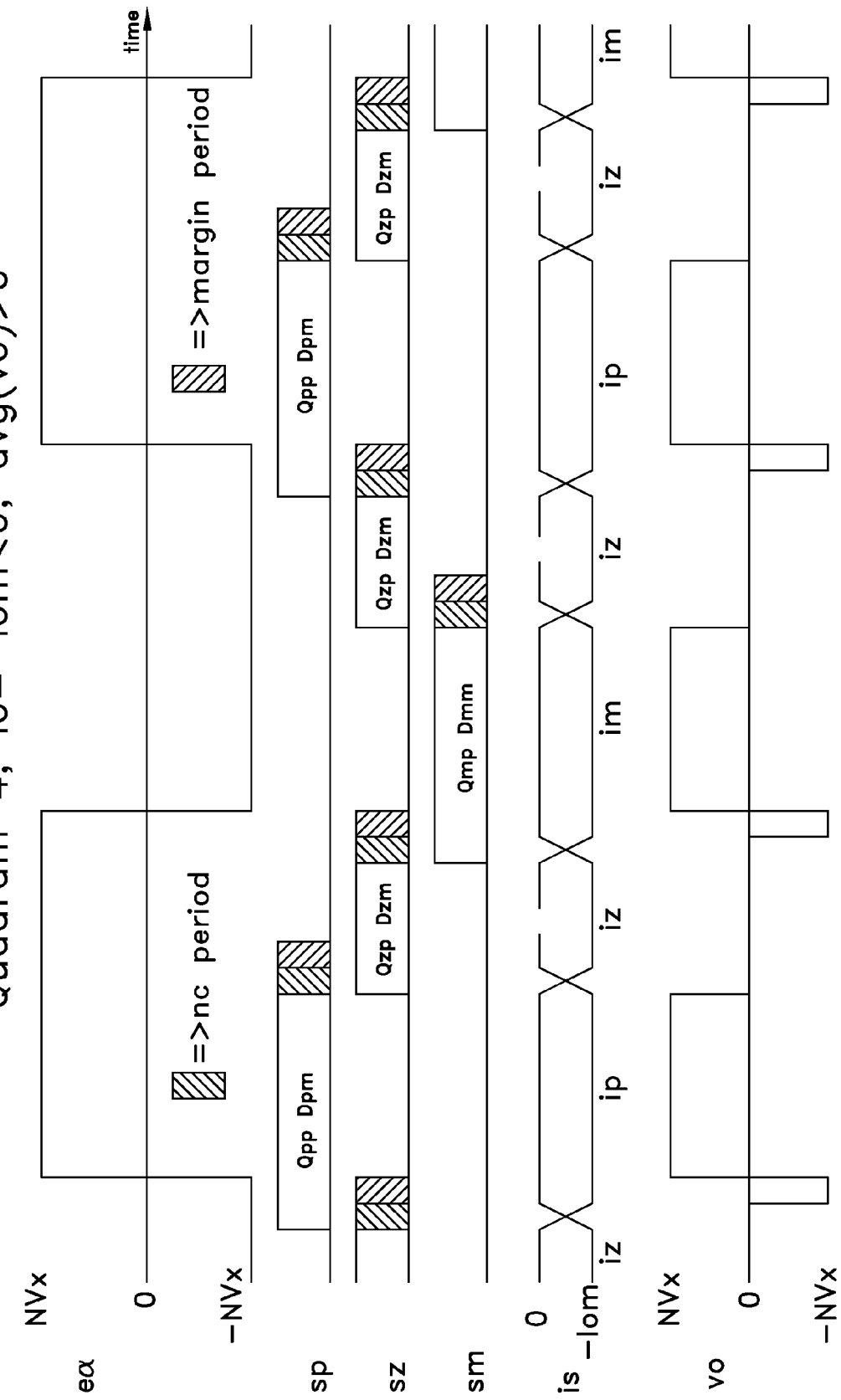

AC BATTERY EMPLOYING MAGISTOR TECHNOLOGY

REFERENCE TO RELATED APPLICATIONS

This application is a continuation-in-part of application Ser. No. 13/103,932 filed on May 9, 2011 entitled AC BATTERY EMPLOYING MAGISTOR TECHNOLOGY the disclosure of which is incorporated herein by reference.

BACKGROUND

1. Field of the Invention

This application relates to AC waveform generation and AC batteries and more specifically to an AC battery structure employing multiple Magistor modules having a series output with pulse width modulation control of one or more of the Magistor modules for high quality waveform output and implementation as an AC battery.

2. Related Art

The power conversion system, designated "Magistor technology" herein, as disclosed in U.S. patent application Ser. No. 12/685,078 incorporates a three winding transformer using an annular or toroidal core 10 and three identical single turn windings 12, 14 and 16, designated as the $\alpha$, $\beta$ and $\gamma$ windings, is shown in FIG. 1. With this type of construction a single turn is simply a single conductor passing through the center of the core. The total current $i_c$ passing through the core or exciting the core is then $$i_c = i_\alpha + i_\beta + i_\gamma (Apk) \qquad (1)$$

where the reference directions for the $\alpha$, $\beta$ and $\gamma$ conductor currents are shown by the direction arrows in FIG. 1. Quantities given in parentheses to the right of a symbol for a variable or a defining equation herein are the units for the variable or the net result of the equation in the MKS system of units. The total magnetic flux $\phi_c$ induced in the core cross section by the excitation current is given by $$\phi_c = i_c/R_c = (i_\alpha + i_\beta + i_\gamma)/R_c (Wb)$$

where $R_c$ is the reluctance of the annular path the flux traverses in the core. The value of the path reluctance is $$R_c = p_m/(\mu Ac)(H^{-1})$$

where $p_m$ (m) is the total effective path length, approximately equal to the circumferential length within the core at the average core diameter, $\mu$ is the magnetic permeability of the core material (H/m), and Ac (m$^2$) is the cross sectional area of the core normal to the flux path direction. The voltage induced in the conductor in each winding path through the core center is, by Faraday's Law, equal to the time rate of change of the linked flux, or $$v_\alpha = v_\beta = v_\gamma = d\phi_c/dt(Vpk) \qquad (2)$$

An electrical equivalent circuit which satisfies the system defining equations (1) and (2) is shown in FIG. 2. The excitation or magnetizing inductance $L_c$ (H) is simply the inverse of the path reluctance $L_c = 1/R_c$ and the circuit element IT 18 is a two winding "Ideal Transformer" with a 1:1 turns ratio. The dot convention for the ideal transformer shows the terminal at which the two winding voltages are equal and in-phase and the two winding currents are equal in magnitude but 180° out of phase. An ideal transformer requires no excitation current and functions over all frequencies, including DC.

Now consider the three winding transformer structure of FIGS. 1 and 2 with the $\beta$ and $\gamma$ windings connected in series. This connection scheme is shown physically in FIG. 3A and electrically in FIG. 3B. Further consider that terminals p 20, z 22 and m 24 in FIGS. 3A and 3B are connected to a common terminal or node o 26, through three controllable bidirectional switches, designated sp 28, sz 30, and sm 32 respectively. The voltage at node o to the common connection point z between the $\beta$ and $\gamma$ windings, creates a reference defined as the output voltage $v_o$ across a terminal pair 34. The total circuit shown in FIGS. 3A and 3B is the basic Magistor converter unit system, here designated as a 1U unit or module 36. This is a completely bidirectional power conversion circuit/system. A variation of the voltage across the $\alpha$ winding will appear as voltage $v_o$ at the output terminal pair 34, dependent on which bidirectional switch is in the closed position (with the assumption that one and only one bidirectional switch is closed at any particular instant). If switch sp is closed then $v_o = v_\alpha$, if switch sm is closed then $v_o = -v_\alpha$, and if switch sz is closed then $v_o = 0$.

Now assume that the $\alpha$ terminals are connected to a square wave voltage source with peak voltage magnitude $V_x$ (V) and cyclic frequency f (cycles per unit of time), trace 38 in FIG. 4A. If switch sp remains closed all the time then output voltage $v_o$ would be equal to the input square wave voltage. If we leave switch sm closed all the time then $v_o$ would be the negative of the input square wave voltage. Of course if we leave switch sz closed all the time the output voltage $v_o$ would be zero, no matter the value of the $\alpha$ input voltage. If the operation of bidirectional switches sp and sm are synchronized to the times at which the input square wave voltage changes sign, the switching circuit can "synchronously" rectify, in either a plus or minus sense, the input voltage $v_\alpha$. For example, if at a rising zero crossing instant in the $v_\alpha$ square wave, switch sm is opened and switch sp closed, and at a falling zero crossing instant in $v_\alpha$ sp is opened and sm closed, traces 40 and 42, the input voltage $v_\alpha$ and the output voltage $v_o$ would be as shown in trace 44. The output voltage $v_o$ would be a "DC" voltage at value $V_x$ (neglecting, for now, very short switching transients at the switching instants). If the switching logic is reversed from that for positive output, that is, sm is closed and sp is opened at rising input zero crossings, and sm is opened and sp is closed at falling input zero crossings, traces 46 and 48 of FIG. 4B, then the output voltage $v_o$ is a negative DC voltage with value $-V_x$, trace 50. In fact any stepwise output voltage, with quantized levels $V_x$, 0 or $-V_x$, can be formed at the output terminals by selectively and synchronously choosing which switch, sp, sz, or sm, operates at any given time. An example arbitrary waveform is shown in FIG. 5.

An expanded multi-level output transformer system is created consisting of two or more of the basic 1U modules of FIGS. 3A and 3B, by connecting the module output terminals in series and the module input terminals in parallel. For example, with two 1U modules 36 connected as shown in FIG. 6, a rudimentary, staircase or step-wise approximation to a sine wave of amplitude $2V_x$ and fundamental frequency f=12 is created. The switching states and the resultant output waveform are shown in FIG. 7.

This series connected 1U module output scheme can be extended to any level desired. Step-wise approximation, at quantized levels of multiples of $V_x$, can then be created for any desired output waveform, in particular, for cyclic sinusoidal AC voltage waveforms. Though this is not limiting, any time varying waveform can be approximated. As described above, a system of N output series connected 1U modules, with all N input terminal connected in parallel, would allow waveform synthesis with 2N+1 discrete output levels (counting zero output as a separate level). But such a system would have the practical disadvantage of requiring N series on-state bidirectional switches in the circuit at any one instant, with the accompanying N forward on-state bidirectional switch voltage drops. On-state forward voltage drops for practical power level switching devices, MOSFETS and IGBTs, range from tenths of volts for low voltage MOSFETs to approximately 2 to 3 volts for high voltage IGBTs. Practical bidirectional switches as shown in FIGS. 8A and 8B, for MOSFET and IGBT implementations respectively, consist of two single switching devices 60, 62 in anti-series connection, each shunted by a bypass wheeling diode 64, so the net forward on-state drop of a bidirectional switch consists of the sum of the forward drop of one active switch and the forward drop (0.5 to 2 volts) of a wheeling diode, for a total drop of approximately 1 to 3 volts. N such drops for a 2N+1 level connection scheme of 1U modules would thus be quite objectionable.

The Magistor system connection scheme as describe in U.S. Pat. No. 8,289,745, having a common assignee with the present application, is based on the properties of a tertiary numbering/counting system to be able to form any decimal integer values with plus, minus, or zero additions of powers of the number 3. That is, $1=3^0$, $2=3^1-3^0$, $3=3^1$, $4=3^0+3^1$, $5=3^2-3^1-3^0$, $6=3^2-3^1$, $7=3^2-3^1+3^0$, and so on. Negative integer values can be formed in a similar manner. This tertiary or "powers of 3" counting scheme suggests an expanded or enhanced Magistor module construction, beyond the basic 1U structure of FIGS. 3A and 3B, in which the transformer output/input ratios are fixed at integer values of 3 to the power of any non-negative integer. For example, a 3U Magistor module can be formed by series connecting the individual β and γ outputs of three 1U module transformers and parallel connecting the three input α windings. A single set of sp, sz, and sm bidirectional switches are connected to the new p, z, and m terminals of the series connected output windings, as shown in FIGS. 9A and 9B. Thus a series connection of the output terminals of a 1U module and a 3U module, and a parallel connection of their inputs, as shown in short form in FIG. 10, could form step-wise outputs, of plus and minus quantized levels, to maximum levels of $\pm 4\,V_x$ (V). The total number of possible quantized output voltage levels is $2(1+3)+1=9$. A sample nine level approximation to a sine wave using this scheme is shown in FIG. 10, with the accompanying required switching operations. Note that this nine level output could also be constructed with four 1U modules with their outputs connected in series, but in this case four on-state bidirectional switches would be conducting in series at any one time. While the 1U+3U system has only two on-state bidirectional switches conducting in series at any one time. A 9U Magistor module would have 9 series connected 1U transformer β and γ outputs and 9 parallel connected 1U transformer α windings. Applying this module in a 1U+3U+9U system, with all outputs connected in series and all inputs connected in parallel, step-wise voltages may be formed with $2(1+3+9)+1=27$ possible levels, at any plus or minus multiple of $V_x$, up to maximum values of $\pm 13\,V_x$. This system would have only three on-state voltage drops at any one time due to bidirectional switches, as opposed to 13 on-state drops in a binary 13 1U module system. Extensions to tertiary 27U, 81U, 243U, and so on, modules can be constructed. The required number of bidirectional switches for the tertiary module system compared to a similar switching level binary module system is similarly reduced. In general, a tertiary Magistor system with M sub modules of the type 1U+3U+ . . . +3(M-2)U+3(M-1) U+3MU would require 3M bidirectional switches in the system of which M would be conducting and in series at any one time. While a same multi-level capable binary system with N=3M+3(M-1)+3(M-2)+ . . . +3+1 1U modules would require 3N bidirectional switches, of which N would be conducting and in series at any one time.

To preserve output waveform quality in a tertiary Magistor converter system, the step level magnitude $V_x$, the square wave drive voltage level at the input α terminals, could be set to a low quantized value, as an example one volt. Theoretically this level of quantization would lead to very high quality waveform synthesis. But practically there are two major problems: 1) this minimum step level change is smaller than the total series voltage drop due to the number of series connected bidirectional switches in the system, and 2) even for a household single phase, 60 Hz, 120 VAC application, the number of series 1U, 3U, 9U, 27U, and so on, modules is excessive. To reach a peak sinusoidal voltage of SQRT(2)*120=170 (Vpk) with a 1.0 (V pk) step level at least a series connection of one each 1U, 3U, 9U, 27U, 81U modules and a partial 243U modules (at least a 170-1-3-9-27-81=49U module) would be required. This six module series set would then have six forward on-state voltage drops due to six bidirectional switches conduction at any one time.

It is therefore desirable to provide a Magistor converter system which reduces switching parasitic voltage drops by reducing the total number of series connected bi-directional switches needed to attain high quality, low harmonic content output waveforms.

SUMMARY OF THE INVENTION

The embodiments disclosed provide a DC/AC converter which incorporates at least one Magistor module having a first sp control switch, a second sz control switch and a third sm control switch. An AC source is connected to an input of the at least one Magistor module. A switch controller connected to the first sp control switch, second sz control switch and third sm control switch to and provides pulse width modulation (PWM) activation of the switches for fine control of the voltage level at an output.

An example implementation of the embodiments disclosed provides an AC battery which employs multiple Magistor modules each having a first sp control switch, a second sz control switch and a third sm control switch and connected in series to an output. DC to AC square wave converters each fed from an associated battery are connected in parallel to inputs of the Magistor modules. A switch controller connected to the first sp control switch, second sz control switch and third sm control switch in each Magistor module provides pulse width modulation (PWM) activation of the switches for controlled voltage at the output.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIGS. 19A-D are trace sets showing the required switch timing schemes to assure natural commutation of the diodes in the bidirectional switch array of a Magistor NU converter for the four cases of possible AC output voltage and current polarities.

DETAILED DESCRIPTION OF THE INVENTION

Figure 11A:
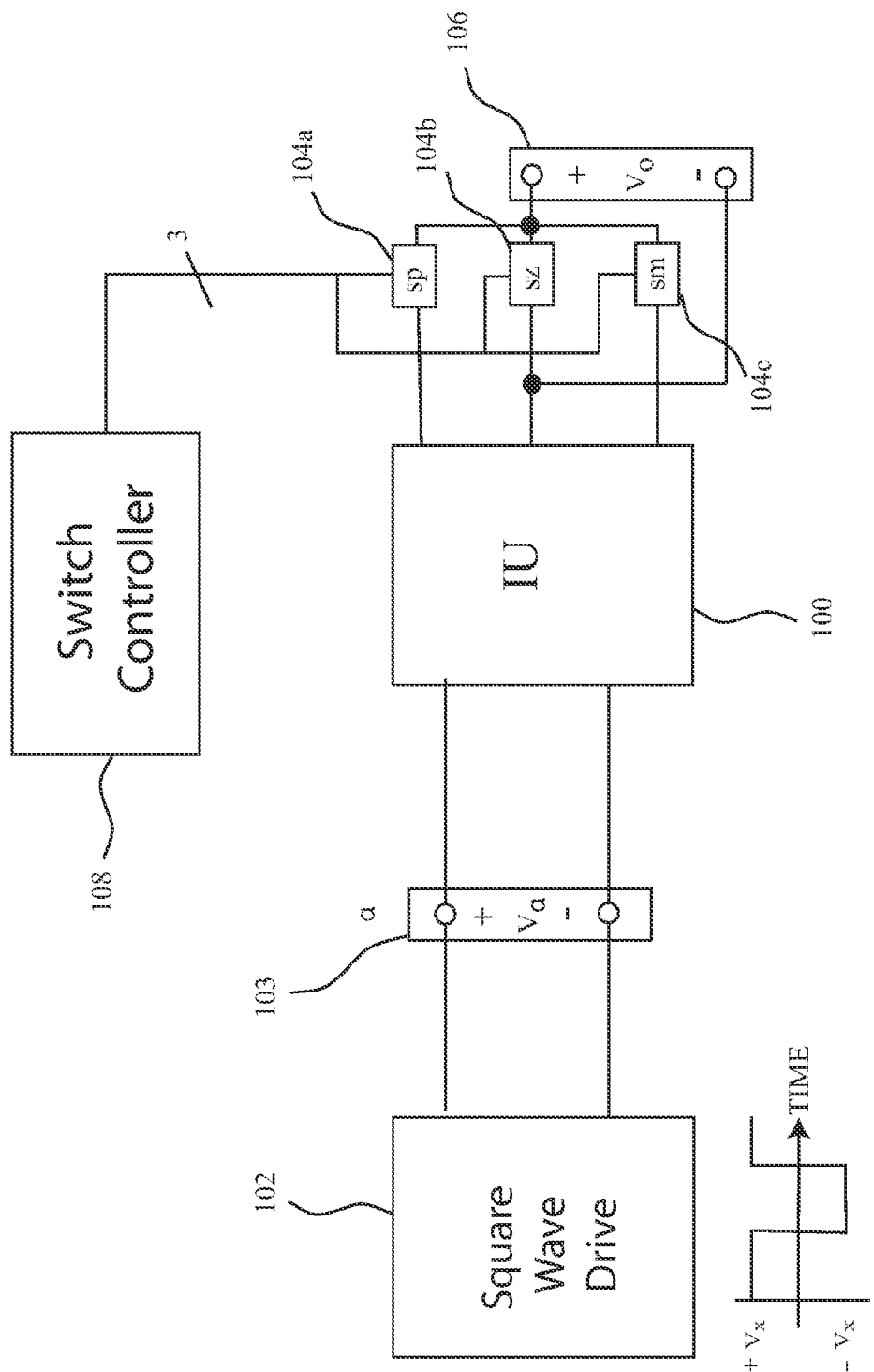
FIG. 11A is a block diagram of a 1U module with switching control for pulse width modulation.
Figure 11B:
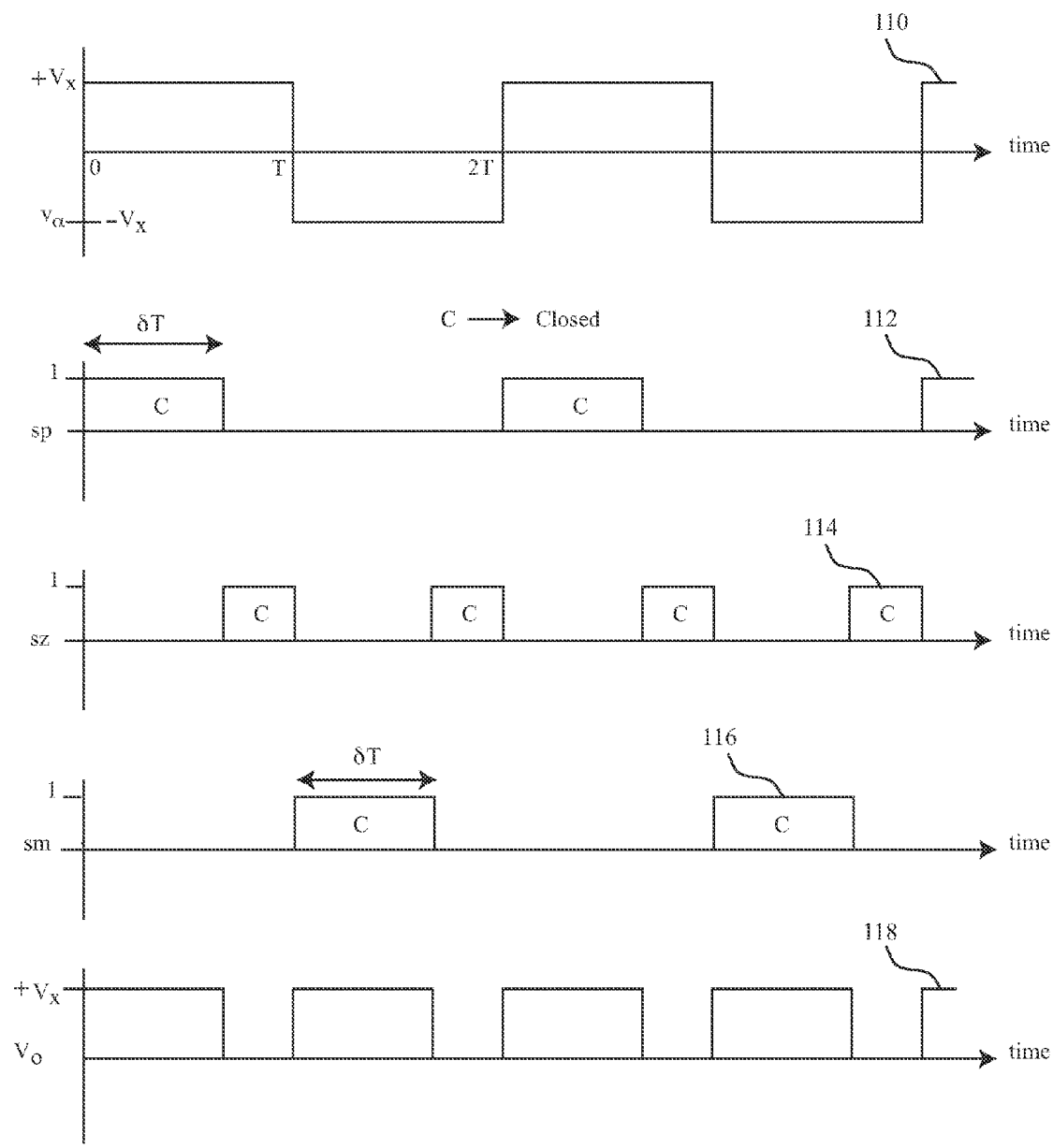
FIG. 11B is a trace set for voltage input, PWM switch control and voltage output for the 1U module of FIG. 11A.

Referring to FIGS. 11A and 11B an improved Magistor converter system utilizing pulse width modulation (PWM) of one Magistor 1U module is demonstrated. As originally conceived the Magistor converter system had no need of PWM operation due to the fact that the envisioned step-wise output waveform synthesis technique would use step voltage increments small enough to insure the desired waveform quality. However, minimum step increments on the order of one volt lead to impractical circuit realizations with excessive numbers of required bidirectional switching elements. PWM operation of a basic Magistor 1U module 100 having a square wave drive 102 connected to α input 103 and control switches sp 104a, sz 104b and sm 104c controlling output 106 as shown in FIG. 11A is achieved with a switch controller 108 connected to the switches providing waveforms for PWM operation shown in FIG. 11B with trace 110 of voltage vo output from the square wave drive and operation of normally open switches sp, sz and sm shown in traces 112, 114 and 116 respectively. If the α terminal input voltage $v_\alpha$ is again a square wave with peak voltage $V_x$, an "average" voltage $v_o$ trace 118 is formed at the output terminal equal to $\pm\delta V_x$, where δ is a switching duty cycle with value $0<=\delta<=1.0$, by utilizing the sz switch in conjunction with the sp and sm switches. In a leading edge PWM scheme (referring to the relative position of a δT extent non zero output voltage within a square wave half cycle of time extent T, in a trailing edge PWM scheme the δT extent non zero output voltage would appear after a delay of $(1-\delta)T$ in each square wave half cycle), for average plus output voltage, sp is closed and sz opened at the rising zero crossing of $v_\alpha$ (it is assumed that switch sz was closed prior to the rising zero crossing instant). At time δT after the rising zero crossing event sz is closed and sp opened. Similarly, at a falling zero crossing of $v_\alpha$ sm is closed and sz opened, and δT later sm is opened and sz closed. On the average the output voltage $v_o$ is then equal to $+\delta V_x$. To obtain a $-\delta_x$ average output the sp and sm operations are reversed from those defined for the $+\delta V_x$ output. Thus, dependent on the degree of time difference controllability of the bidirectional switch drive mechanisms (how fine the control of different δT times can be) an output voltage is attainable at nearly any level between $\pm V_x$. Through use of PWM operation there then is no need to limit $V_x$ to small voltage levels to obtain good waveform quality. $V_x$ could in fact be raised to the peak voltage required at the output terminals of the entire system, and the entire Magistor converter system could be formed with a single high voltage 1U module.

Figure 12:
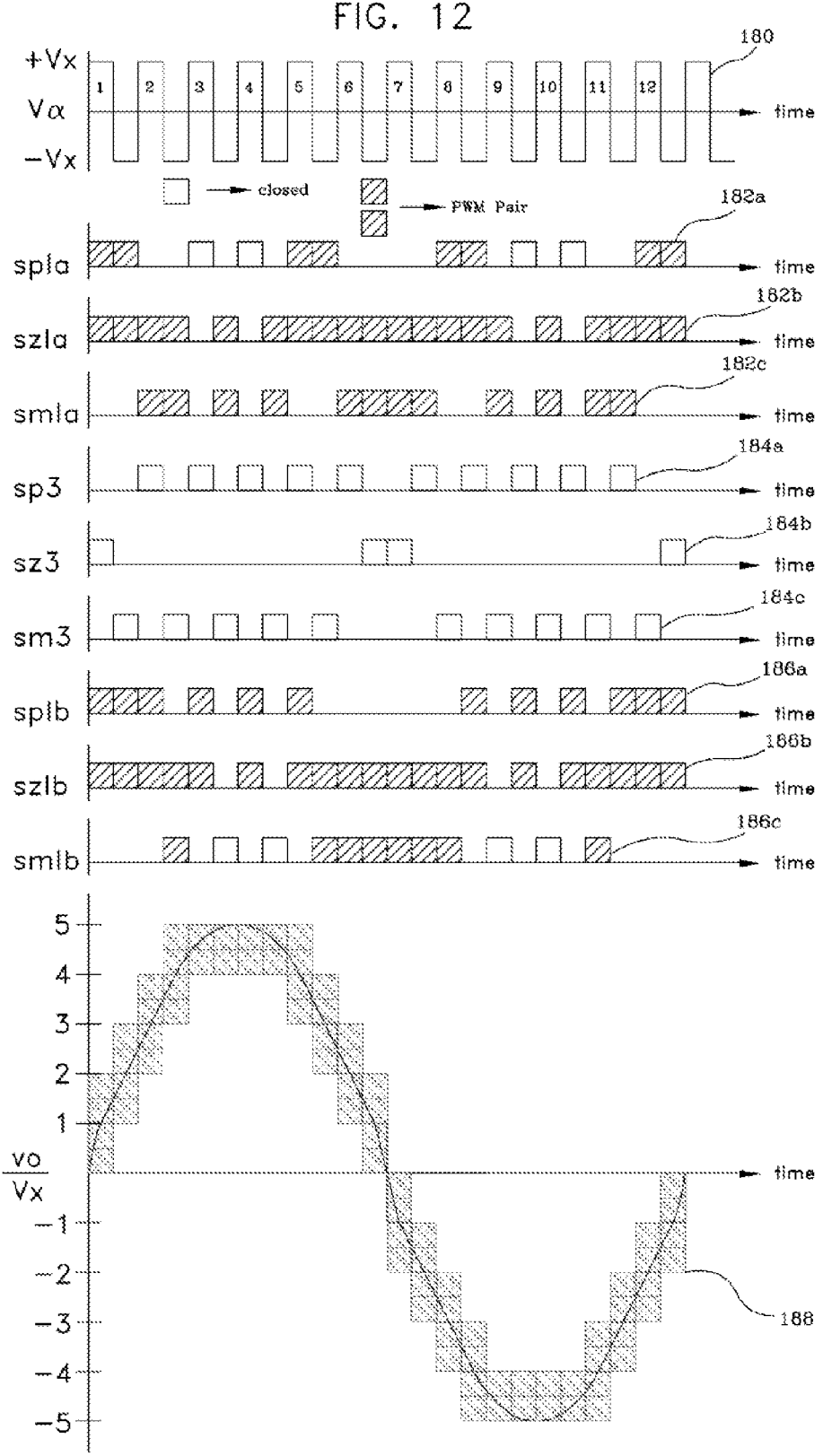
FIG. 12 is a trace set for combined stepwise and PWM sine wave approximately using a 1U+3U+1U Magistor converter.
Figure 13:
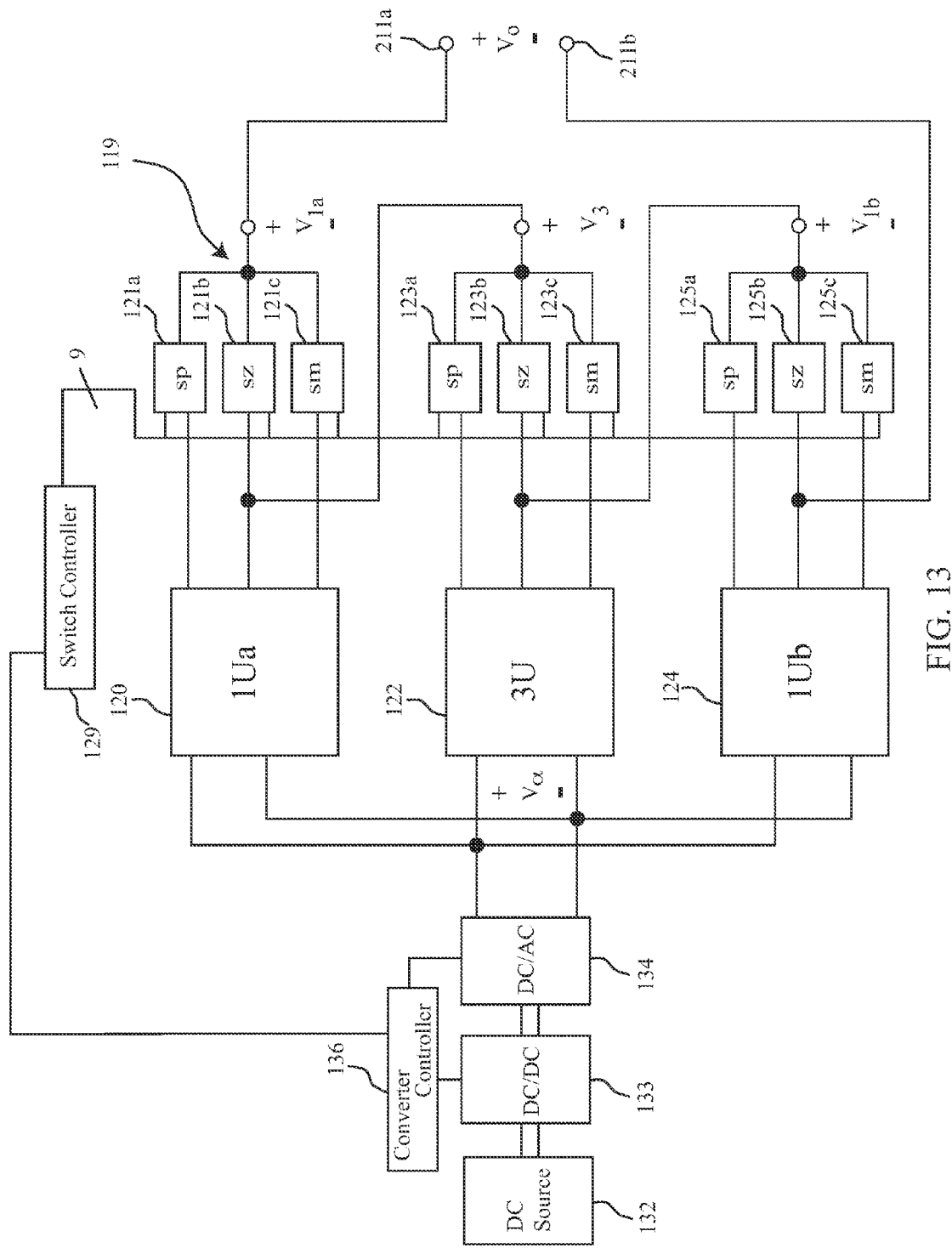
FIG. 13 is a block diagram of the 1U+3U+1U Magistor converter.

However, for an alternative embodiment, the quality of the output waveform, using fixed frequency PWM, can also be improved (lower total harmonic distortion) if the PWM output is limited to only a portion of the output, with the remainder made up of discrete step-wise levels. Therefore PWM operation can be limited within a Magistor converter system to a single 1U module. For example, for a 1U+3U system any average output value between $\pm 4V_x$ may be attained, while for a 1U+3U+9U+1U system any average output value between $\pm 14V_x$ can be attained, and so on. In yet another alternative embodiment, the PWM operation duty between the two Magistor 1U modules in a 1U+3U+1U system may be split to share the extra switching losses due to PWM operation. An example of PWM operation for this alternative embodiment is shown in FIG. 12 for a Magistor converter 119 having connected in series a Magistor 1U module, a Magistor 3U module and a Magistor 1U module (a 1U+3U+1U system), as shown in FIG. 13, with a sine wave output of peak magnitude $5V_x$. In FIG. 13 the 1U+3U+1U system incorporates a first Magistor module 1Ua 120, a second module 3U 122 and a third module 1Ub 124. The potential quality of this waveform far exceeds that of a fixed level, non-PWM 1U+3U+1U system. Bidirectional switches sp1a 121a, sz1a 121b and sm1a 121c are provided for control of module 1Ua 120. Similarly, bidirectional switches sp3 123a, sz3 123b and sm3 123c are provided for control of module 3U 122 and bidirectional switches sp1b 125a, sz1b 125b and sm1b 125c are provided for control of module 1Ub 124.

All the paralleled α input windings of the Magistor module transformers in FIG. 13 are fed by a single AC source consisting, for example, of a bidirectional power flow DC to AC square wave converter 126, such as a full bridge converter, fed in-turn from a bidirectional power flow DC to DC converter 127, such as a buck-boost switching converter with peak output DC voltage $V_x$, fed in-turn from a DC source 128, such as a series connection of battery cells with total DC voltage less than $V_x$. Switch controllers 129 and 136 are provided for control of the internal output side bidirectional switches and the switching devices in the input side DC to DC and DC to AC converters. With the $v_\alpha$ input shown in trace 180 of FIG. 12, control of the switches as shown in FIG. 12 by traces 182a for sp1a, 182b for sz1a, 182c sm1a, 184a for sp3, 184b for sz3 184c for sm3, 186a for sp1b, 186b for sz1b and 186c for sm1b (where cross hatching shows PWM pairs for the switching) provide a highly refined approximation of a sinewave voltage output as shown by trace 188.

With this PWM included embodiment there is an incentive to raise $V_x$ and lower the number of required higher order U modules for a given required AC output voltage. The fewer the number of higher order U modules (such as 3U, 9U, 27U, etc) the fewer the number of required bidirectional switches. On the other hand, if the DC bus voltage $V_x$ is raised too high, there will be safety concerns, particularly if the DC bus is fed from a battery bank, with DC high voltage, potentially at lethal levels, present even during the converter off-state.

Figure 14A:
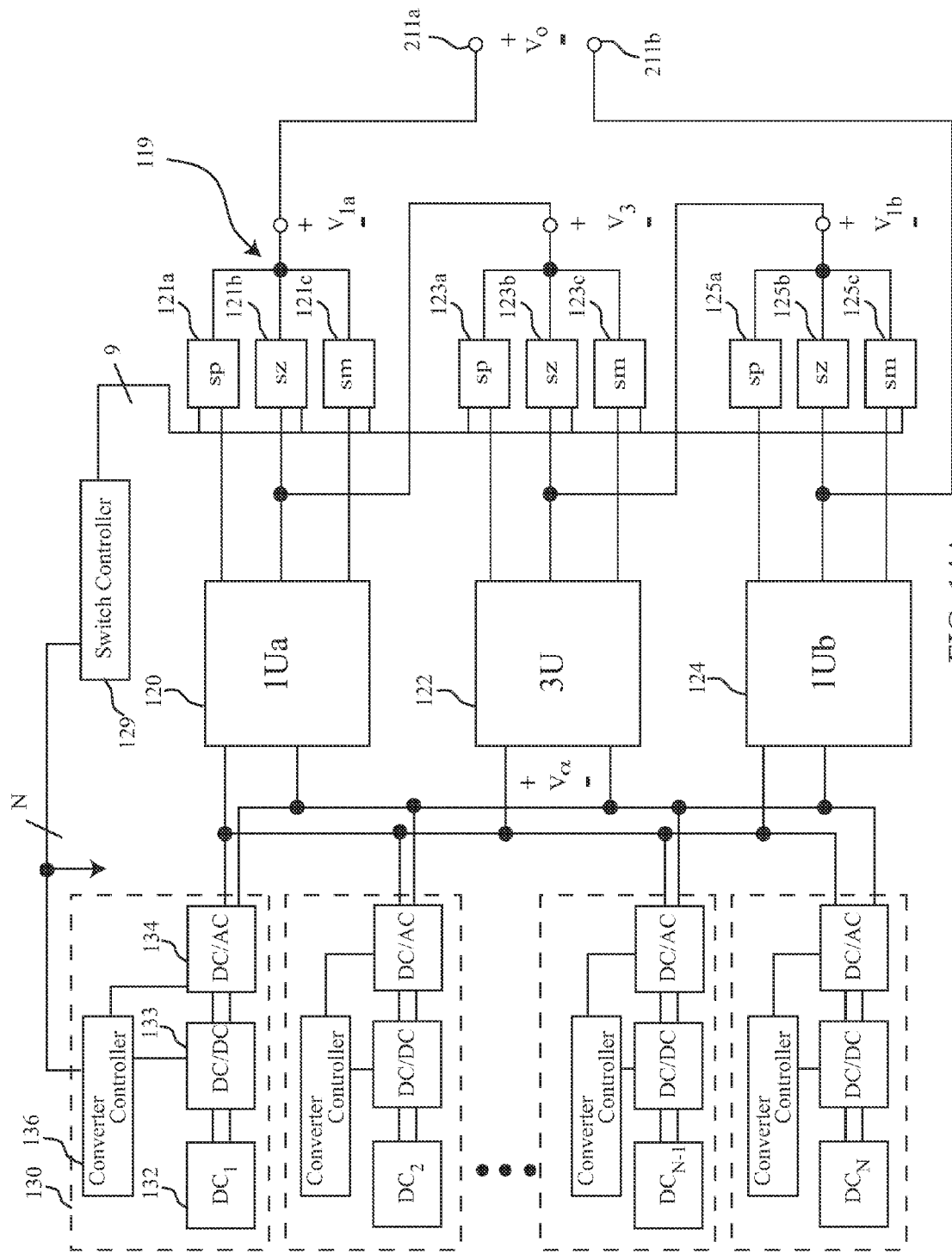
FIG. 14A is a block diagram of a 1U+3U+1U Magistor converter with parallel DC input systems connected in parallel at the α input terminals of the Magistor modules.
Figure 14B:
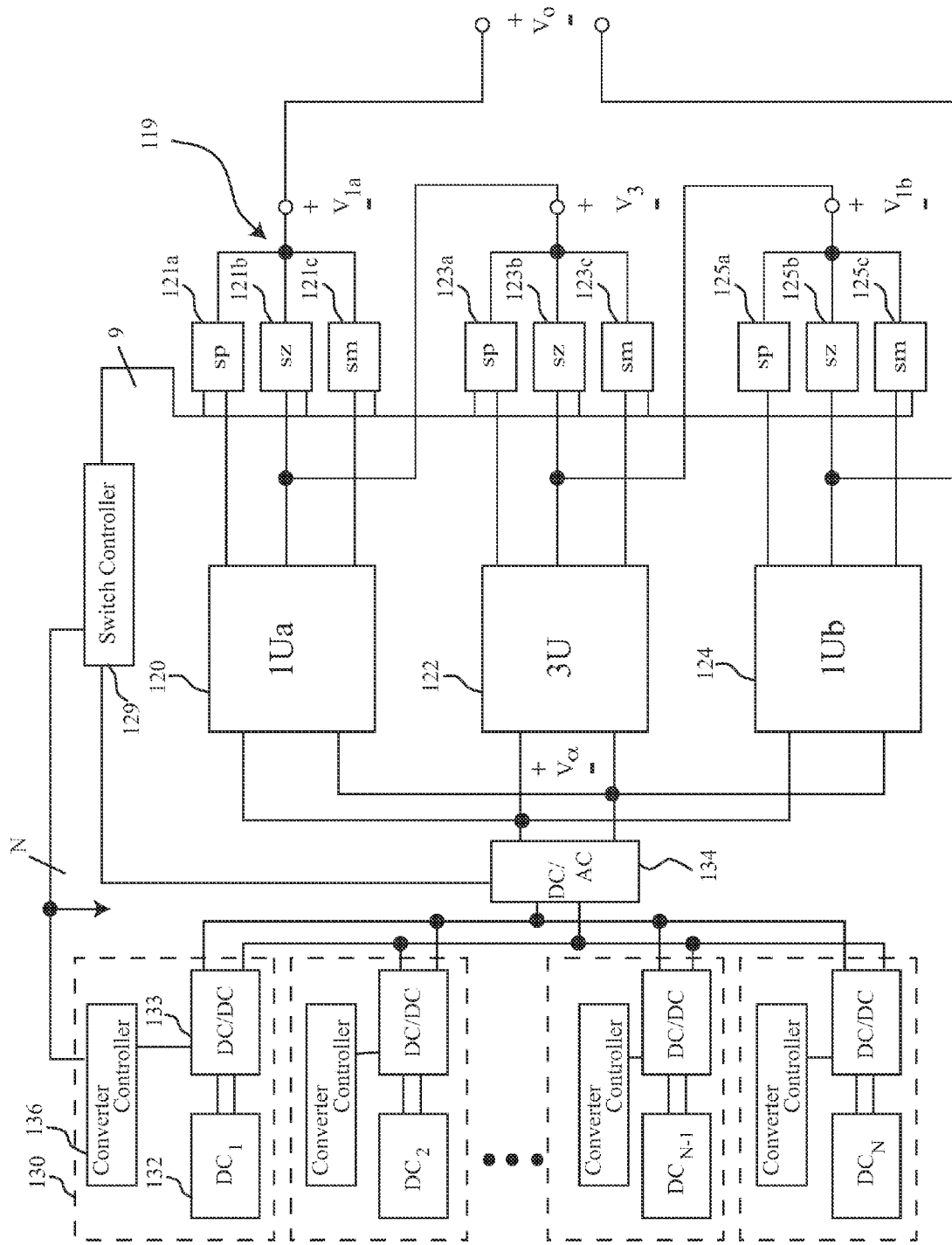
FIG. 14B is a block diagram of a 1U+3U+1U Magistor converter with parallel DC input systems connected in parallel at the DC terminals of a common single DC/AC converter which drives the α windings of the Magistor modules.

A Magistor converter system is suitable for a large range of applications when provided with electrically paralleled subsystems. For the generic 1U+3U+1U Magistor converter system shown in FIG. 13, to increase the power capability of the total system, but also to keep the output AC voltage level the same as in the base system, alternative embodiments may simply increase the power capability of each component in the system shown. This would also require increasing the DC feed capability at the DC terminals. If this DC feed is due to batteries this requires using higher current capability batteries or paralleling cells or stacks of lesser rated battery packs. However, paralleling batteries may be limited due to current sharing problems. As an alternative, the entire system shown may be duplicated, as many times as needed to attain the required power capability, and the systems connected together electrically parallel at the AC output $v_o$ terminals. This method avoids the issues of paralleling uncontrolled DC sources, but requires duplication of potentially the most expensive components in the entire system, the collection of bidirectional switches and their required high speed control system. As yet another increased system power alternative, the power capability of each component in the system shown in FIG. 3 can be increased. But rather than use parallel DC sources feeding an increased power capability DC/DC to DC/AC converter string, multiple DC sources feeding multiple DC/DC to DC/AC converter strings are employed. Two variations of this concept are given in FIGS. 14A and 14B. FIG. 14A shows electrically paralleled DC source and converter strings 130, each having a DC source 132 a DC/DC converter 133 and a DC/AC converter 134, connected in parallel at the AC outputs of the converter strings, all the strings providing a common AC output voltage $v_\alpha$. FIG. 14B shows electrically paralleled DC source and DC/DC converter strings 131, each having a DC source 132 and a DC/DC converter 133 with an associated converter controller 136, connected in parallel at the DC input to a single DC/AC converter 134, which solely provides the Magistor transformers' primary side voltage $v_\alpha$. Either primary side system, that shown in FIG. 14A or that shown in FIG. 14B, can be employed, but the single DC/AC square wave converter scheme of FIG. 14B would be perhaps simpler to control, as all the switches and their switching times in the multiple DC/AC converter scheme of FIG. 14A would have to be synchronized and would thus require precise communication and timing hardware.

The embodiments shown in FIGS. 14A and 14B are both generically described as "parallel DC source" systems. The "parallel" connection in the system of FIG. 14A is at an AC set of terminals, while the "parallel" connection in the system of FIG. 14B is at a DC set of terminals. In both cases, however, current regulation and therefore power level and direction control for the individual DC source and converter strings are both attained by control of the individual DC/DC converter stage in the particular source-converter string. There are also reliability benefits to the configurations given in FIGS. 14A and 14B. Should any particular DC source element 132 within any particular source-converter string 130, such as an individual battery cell, fail or degrade sufficiently in operation capability, that particular source-converter string can be electronically isolated or removed simply by turning off and locking off the switching devices in the given converter string (both the DC/DC and DC/AC converters in the subject string in FIG. 14A, and the just the DC/DC converter in the subject string in FIG. 14B). The total system power capability/rating is then lowered, but operation at least at partial output is assured. DC sources could even be removed while the remaining system is still operating, a "hot swap" capability. Different types or ratings of DC sources, such as different types of batteries, or even ultra-capacitors may be freely mixed. In each source-converter string, current regulation control of each individual DC/DC converters by the associated converter controller 136 maintains each source at its desired operating point.

Figure 15:
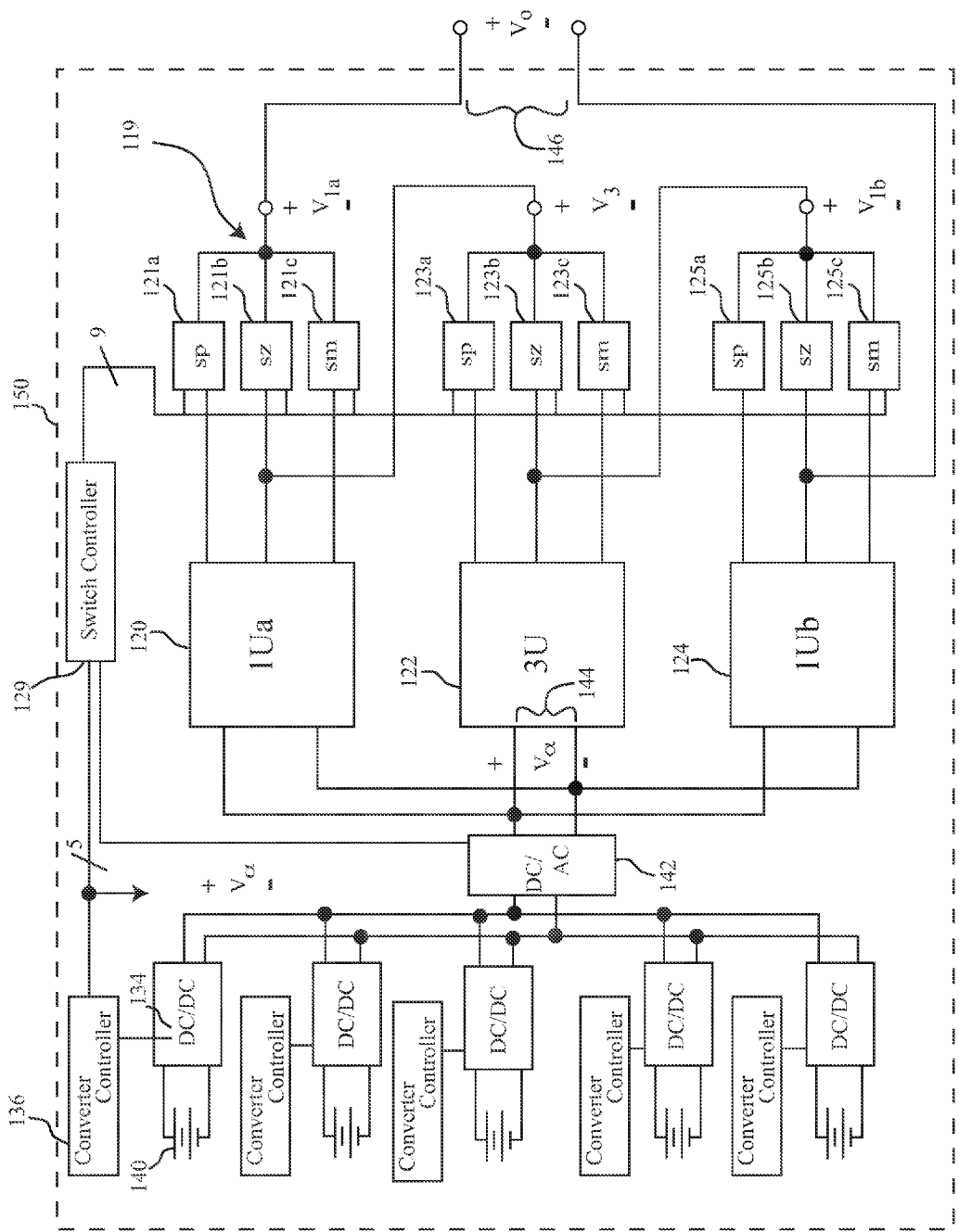
FIG. 15 is a block diagram of a 1U+3U+1U Magistor converter with parallel battery DC input systems for an AC battery system.

An AC battery may be provided using the either of the parallel DC source systems of FIG. 14A or 14B. A particular Magistor AC Battery system with paralleled DC sources and associated converter strings of the type of FIG. 14B is shown in FIG. 15, with the specific use of DC batteries 140 as the DC sources. For an exemplary embodiment each battery may comprise 12 series Lithium Ion (Li-Ion) cells such as cells produced by A123 Systems of Waltham, Mass. having part numbers APR18650 (1.1 Ahr), ANR266250 (2.3 Ahr), AHR32113 (4.4 Ahr) or the higher energy AMP20M1HD-A (20 Ahr). There are five identical battery and DC/DC converter combinations, electrically paralleled at the DC input terminals of a single DC/AC converter 142 whose AC output is at the low voltage terminals 144, the α terminals of the 1U+3U+1U Magistor converter system 119. A five unit DC source system is shown as an example for this embodiment but this number is not limiting as to the total number of parallel DC source DC/DC converter pairs which may be employed. The rating of this example combined package is approximately equal to five times the rating of an individual battery pack. For example, if the thermal rating of an individual battery pack is 1 kW then the entire system would be sized to have a total thermal rating of approximately 5 kW.

The terminology "AC Battery" is used to describe this entire system, since the system behaves as a re-chargeable electrical energy storage device at the high voltage AC terminals 146, with a two wire single phase AC connection input/output.

For household and consumer application in the U.S. the high voltage two wire AC connection would be at 60 Hz, 120 VAC (all sinusoidal voltage magnitudes disclosed herein unless otherwise defined imply a root-mean-square (rms) value). When AC power flows into an AC battery at the AC terminals, it is converted to controlled AC and DC power flow; whereupon it charges batteries connected to the input DC terminals of the DC/DC DC/AC converter string subsystems on the low side of the Magistor module transformers. When power is required in the AC network connected to the high side AC terminals, for example to support a temporarily weak AC system, or even fully support a local AC system during a grid outage, or to feed a stand alone AC load, the power flow process is reversed in direction, but with the same effective level of power flow control. This control, both during charge or discharge of the batteries, is achieved both by current regulation and power direction control in the DC/DC converters connected to the individual DC sources and by control of the bidirectional switches on the AC network side of the Magistor transformers to achieve amplitude and relative phase angle control (i.e. "vector" control, as accomplished in modern AC motor drives) of the output AC voltage at the AC terminals with respect to the system or grid AC voltage at the point of system/grid connection.

Figure 16A:
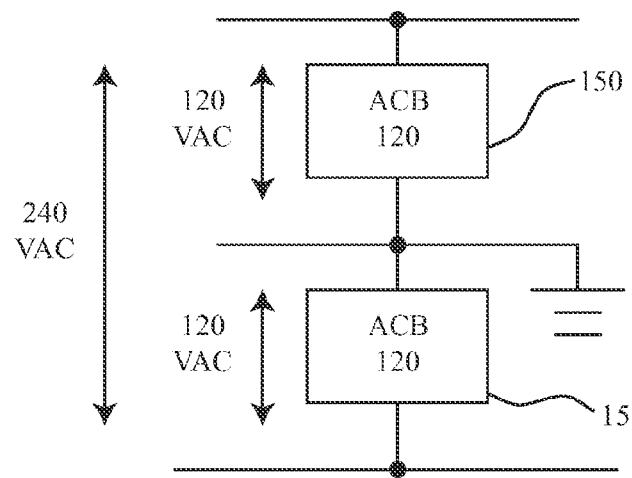
FIGS. 16A-D are block diagrams of connection schemes for the AC battery system of FIG. 15.
Figure 16B:
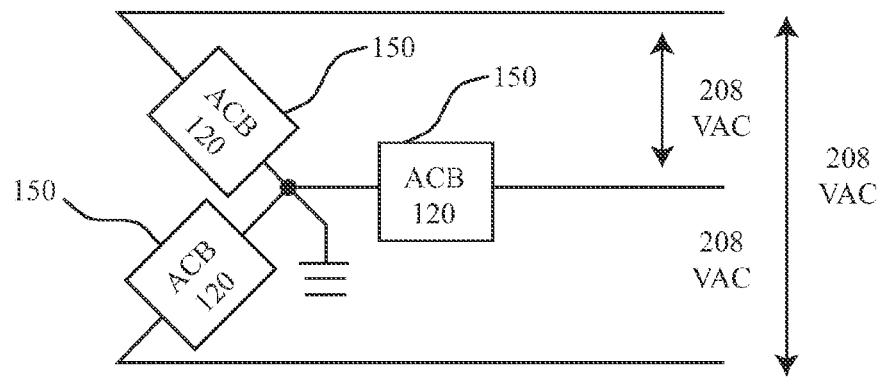
Figure 16C:
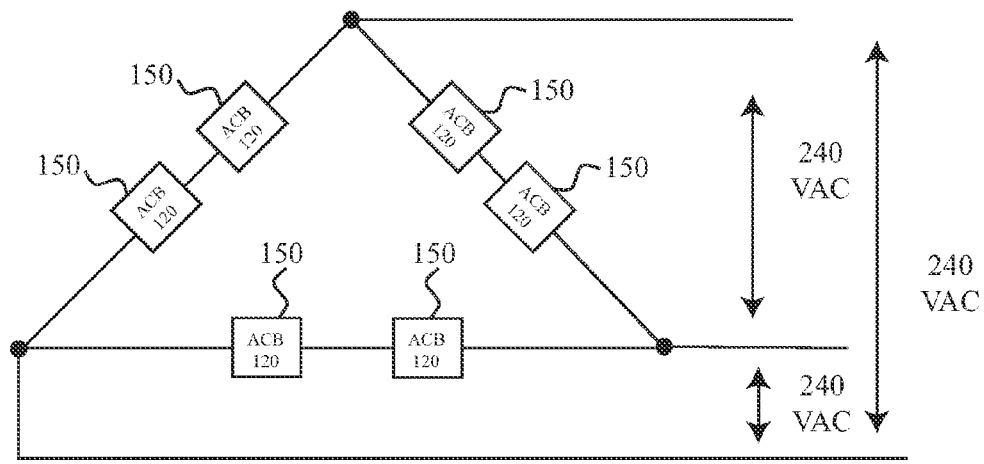
Figure 16D:
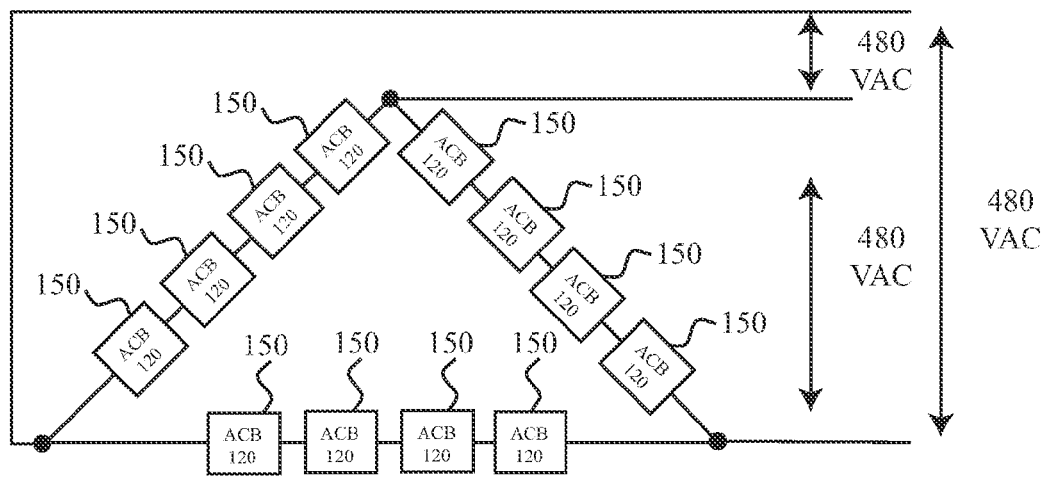

Beyond the single phase 60 Hz 120 VAC AC battery, higher voltage higher power rated AC battery systems can be formed by various combinations of multiple 120 VAC building blocks of the type exemplified by the Magistor AC Battery system 150 as shown in FIG. 15. Two single phase 120 VAC systems 150, synchronized and series connected with the common connection point grounded would form a three wire 240/120 VAC Edison system, as shown in FIG. 16A. Three 120 VAC single phase systems synchronized but phase displaced from each other by 120° and connected in a wye configuration would form a commercial/industrial 208 VAC 1-1 3-phase system, shown in FIG. 16B. Three 240 VAC systems (two 120 VAC synchronized and in-phase systems connected in series), all synchronized but phase displaced by 120° from each other, connected in a delta configuration would form an industrial 240 VAC 1-1 3-phase system, shown in FIG. 16C. And three 480 VAC systems (four 120 VAC single phase systems, synchronized and all in-phase, connected in series) all synchronized but phase displaced from each other by 120°, would form an industrial 480 VAC 1-13-phase system, shown in FIG. 16. Further extensions to even high voltage systems should be obvious. And to increase the power rating or capability of any of these building block system AC batteries, parallel connection of multiple 120 VAC systems, all synchronized and in-phase, at each 120 VAC subsystem station may be accomplished. Thus a common design Magistor AC Battery system 150, such as that shown in FIG. 15, can be utilized in a great many applications, without power or voltage limitations. This overall modularity of the system design will lead to low production costs due to mass production of identical components.

For the specific Magistor AC battery system 150 shown in FIG. 15 with a 120 VAC AC side rating the peak DC voltage $V_x$ at the DC terminals of the DC/AC square wave converter subsystem (assuming a full bridge converter circuit) would be sqrt(2)×120/5=33.9 (VDC). The use of Li-ion batteries, with individual cell voltages of approximately 3.0 VDC at heavy discharge, requires a series string of at least 11 cells (12 being a safer number) for each battery pack.

Figure 1:
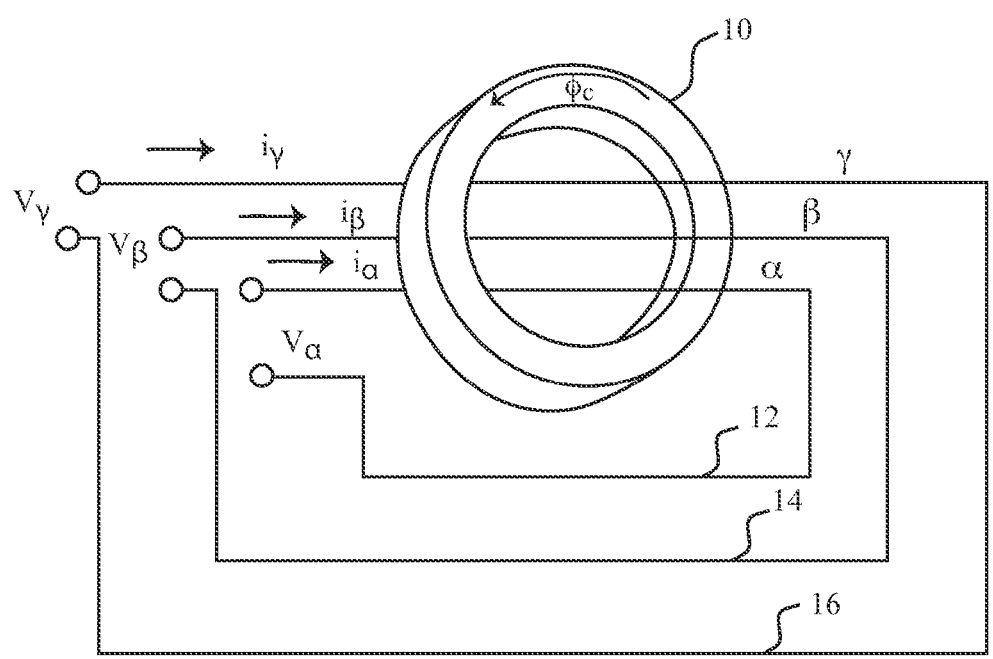
FIG. 1 is a representation of a toroid core with three single windings.
Figure 2:
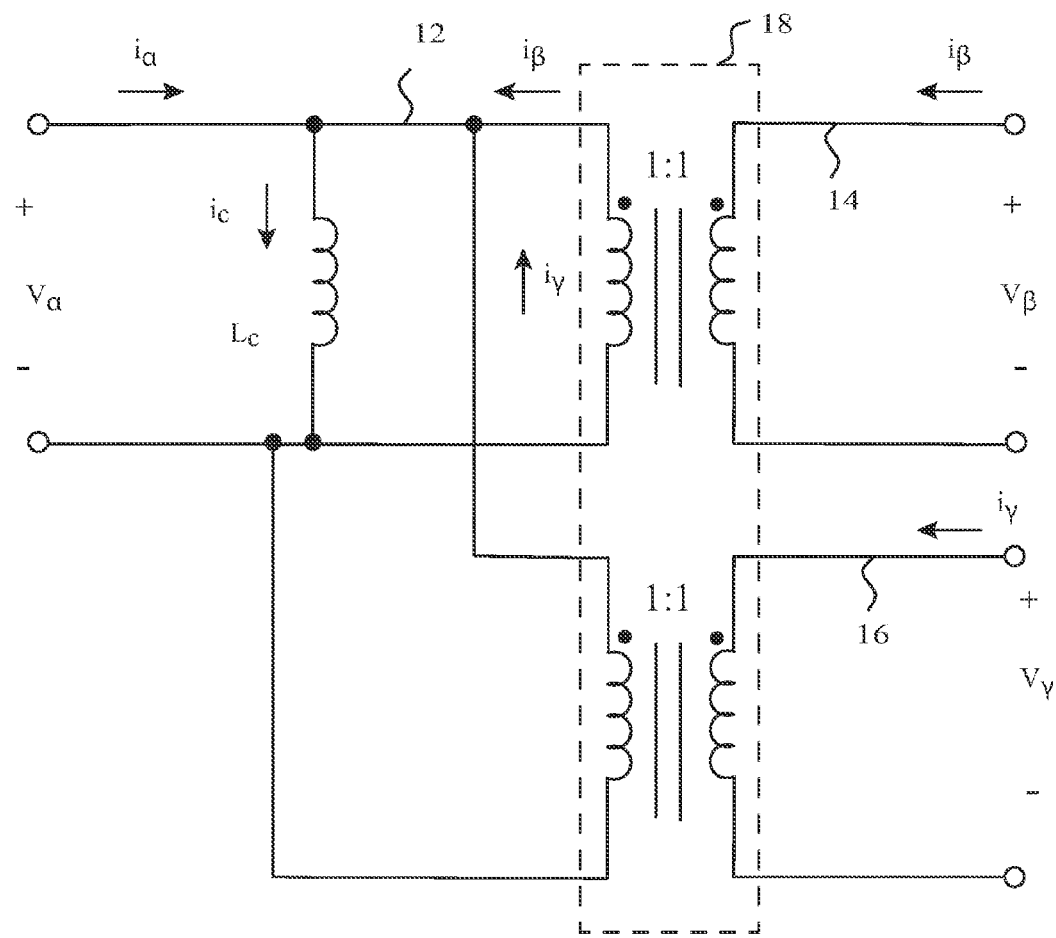
FIG. 2 is an electrical schematic representation of the structure of FIG. 1.
Figure 3A:
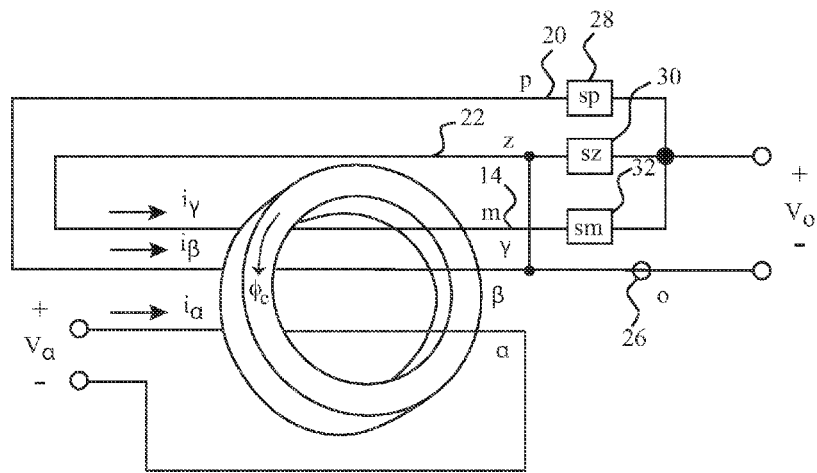
FIG. 3A is a representation of Magistor 1U module.
Figure 3B:
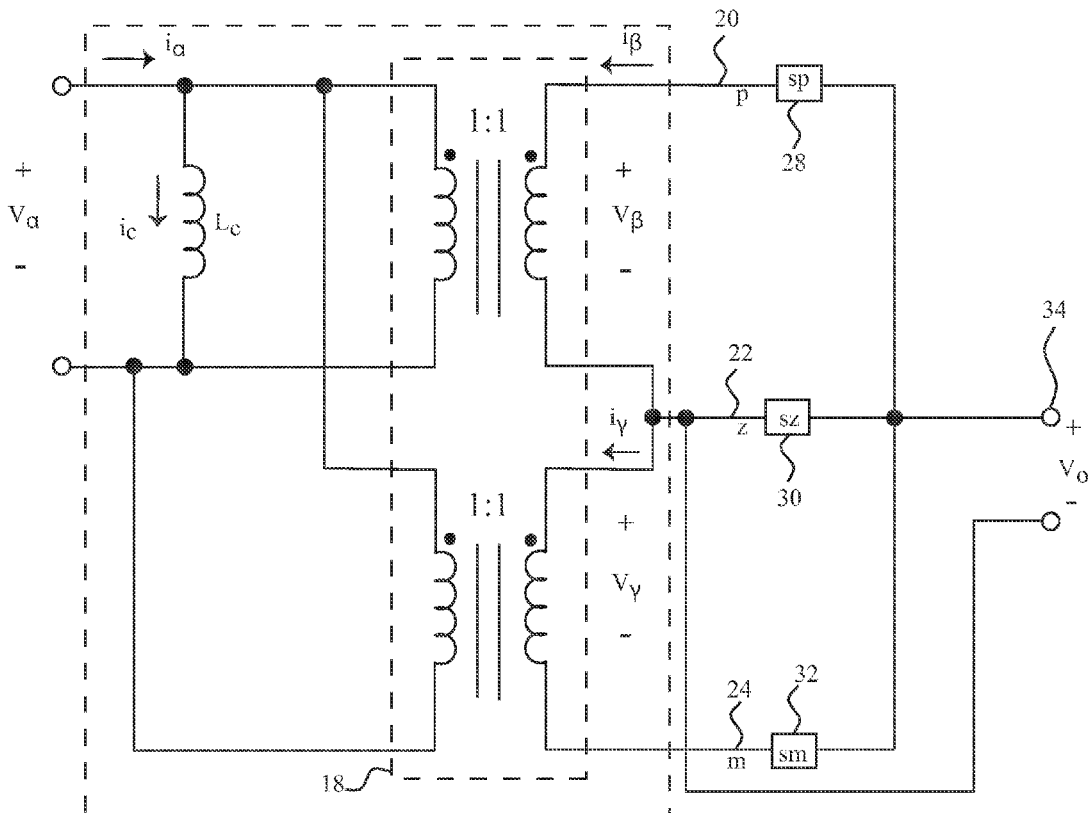
FIG. 3B is an electrical schematic representation of the Magistor 1U module of FIG. 3A.
Figure 4A:
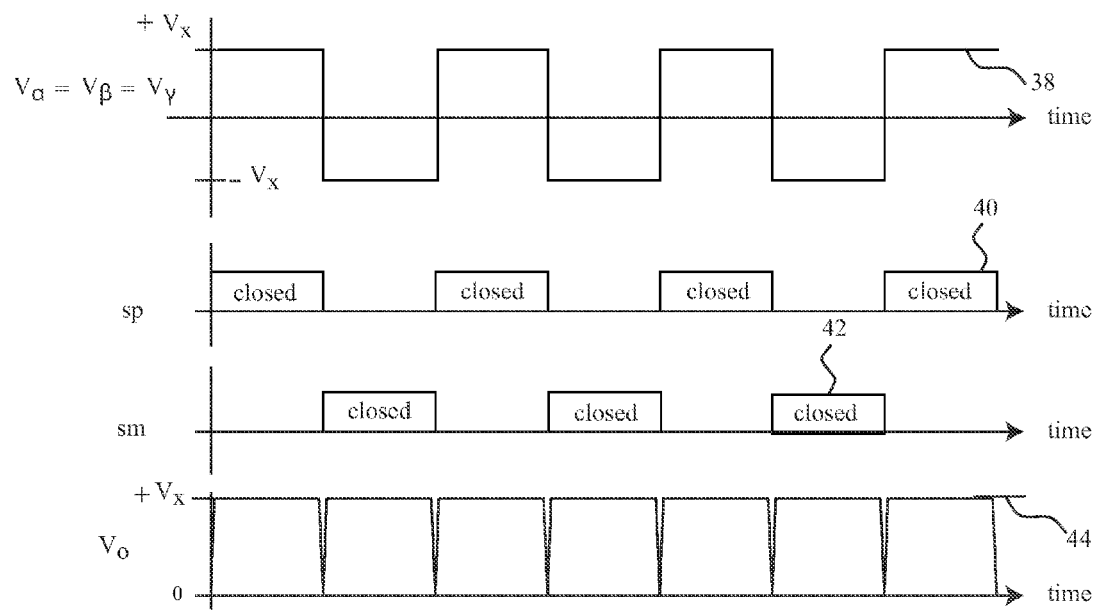
FIG. 4A is a trace set representing voltage input, switching control and positive voltage output for a Magistor 1U module.
Figure 4B:
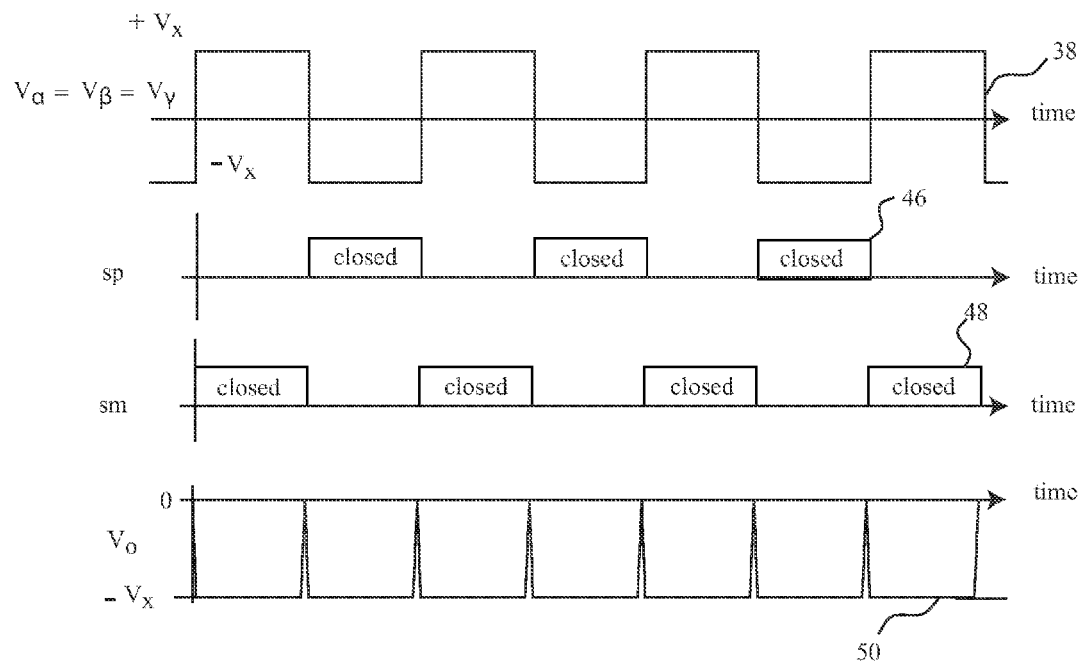
FIG. 4B is a trace set representing voltage input, switching control and negative voltage output for a Magistor 1U module.
Figure 5:
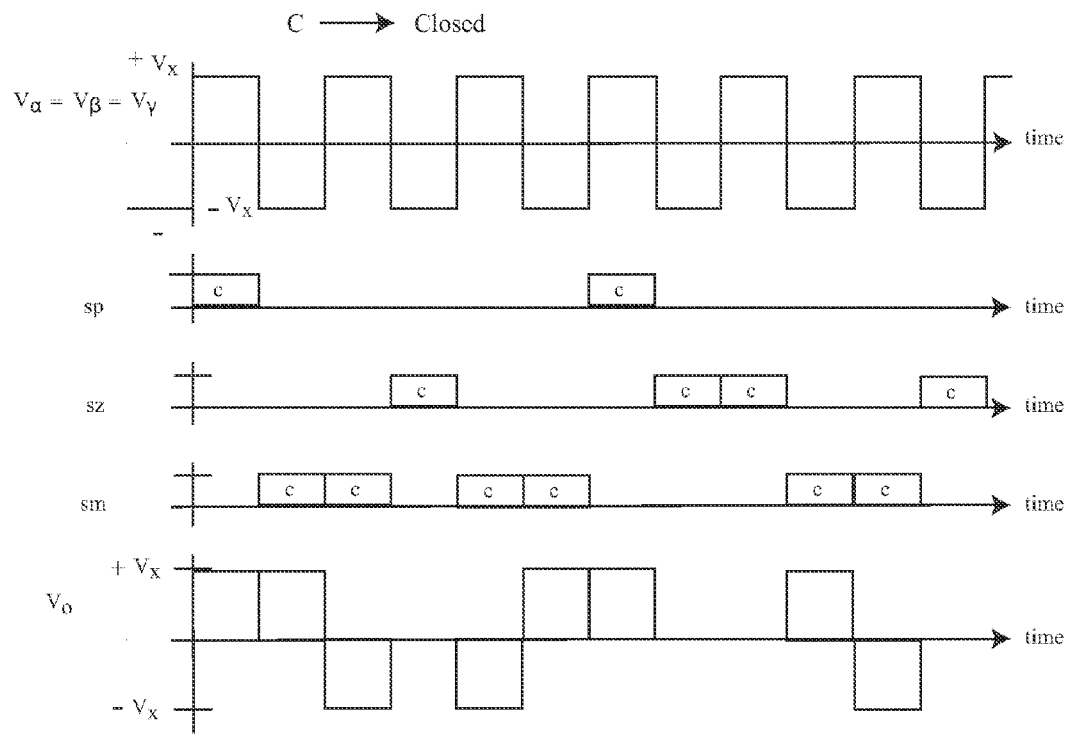
FIG. 5 is a trace set representing voltage input, switching control and voltage output for a Magistor 1U module with arbitrary synchronous rectification.
Figure 6:
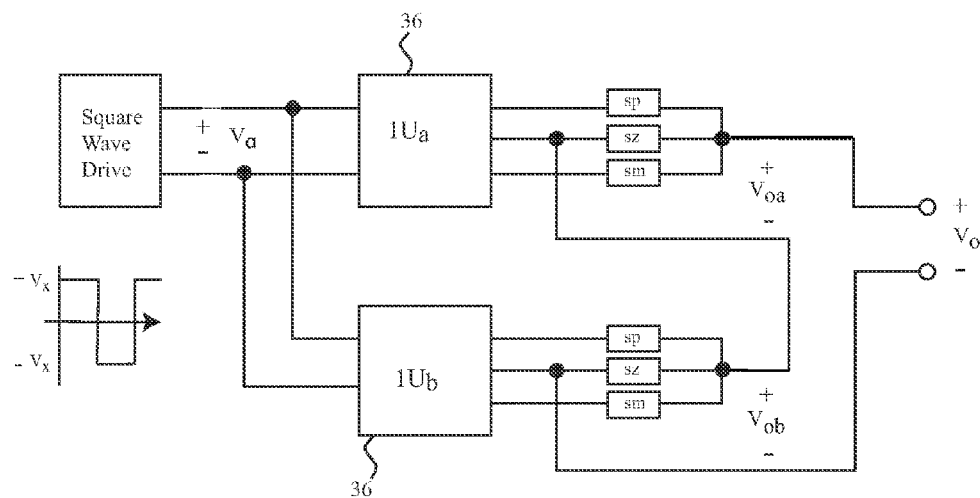
FIG. 6 is a block diagram of two Magistor 1U modules connected in series.
Figure 7:
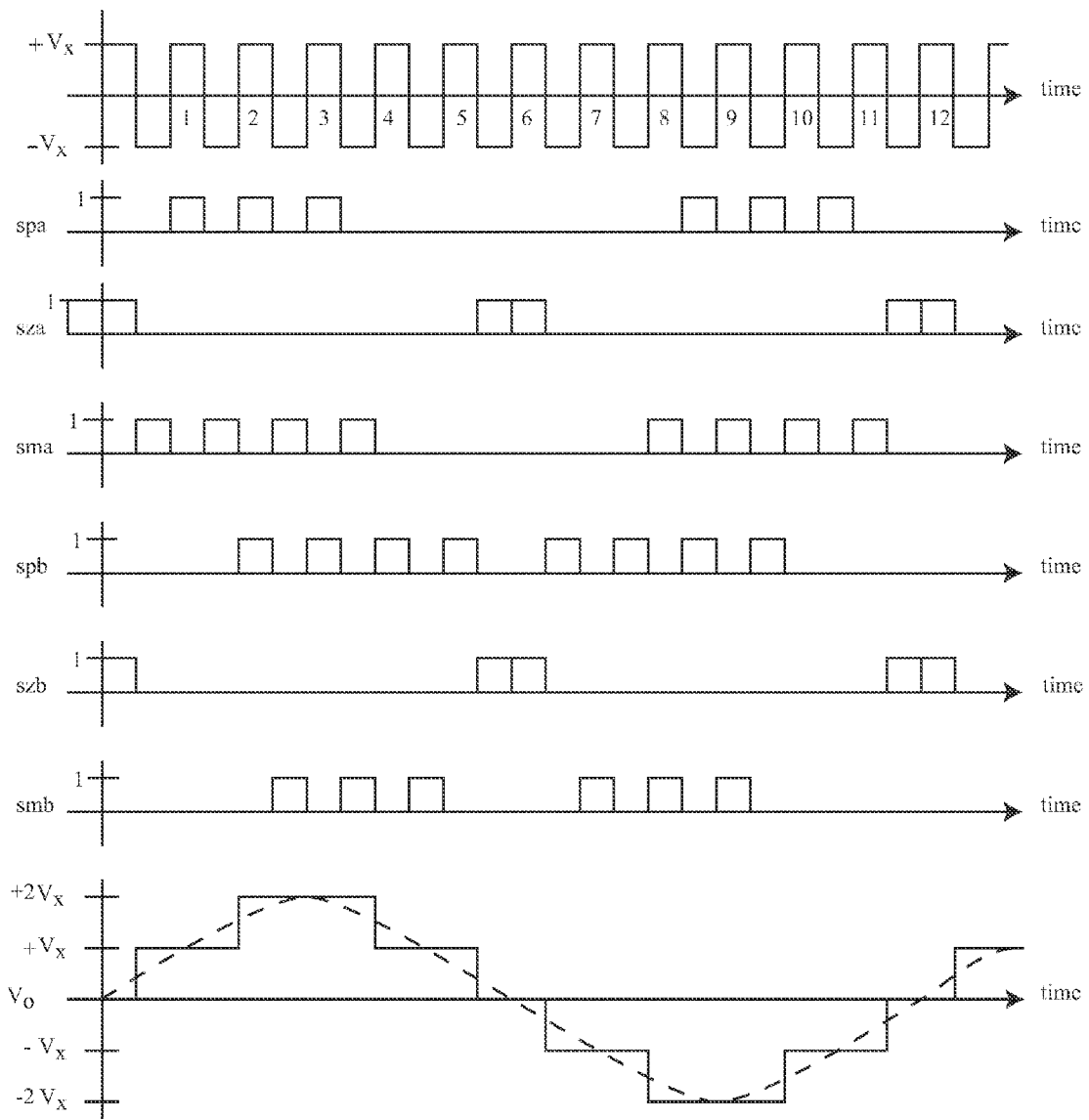
FIG. 7 is a trace set representing voltage input, switching control and voltage output for the two Magistor 1U modules of FIG. 6 providing a step wise approximation to a sine wave.
Figure 8A:
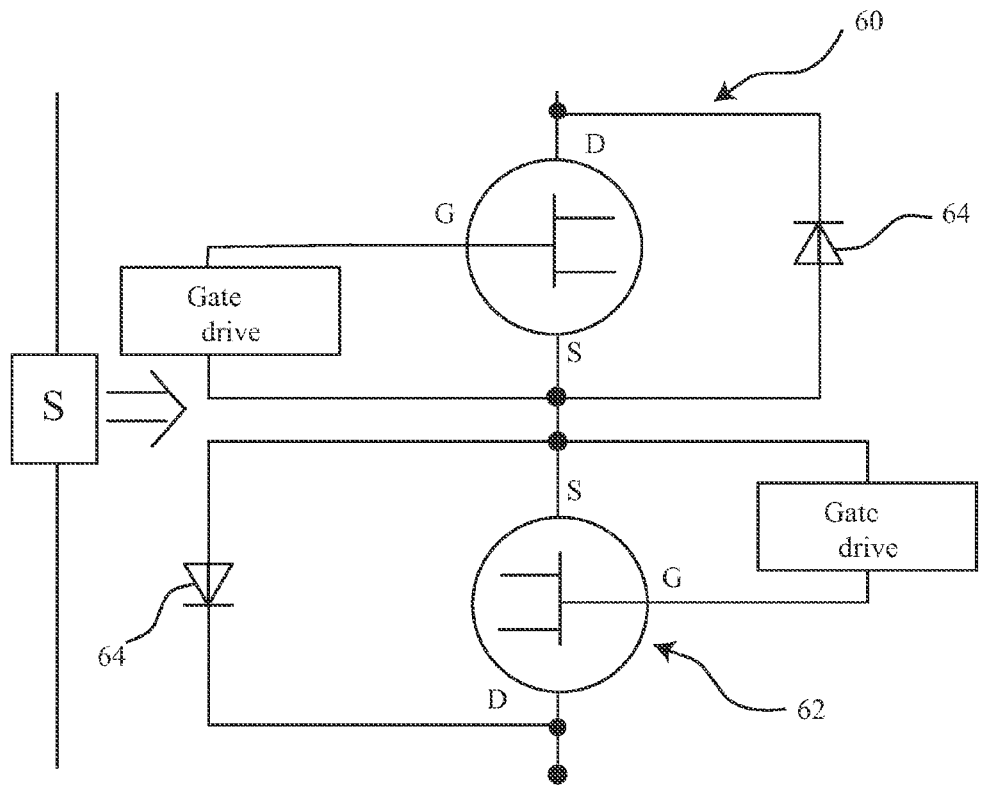
FIG. 8A is a schematic diagram of a MOSFET bidirectional switch.
Figure 8B:
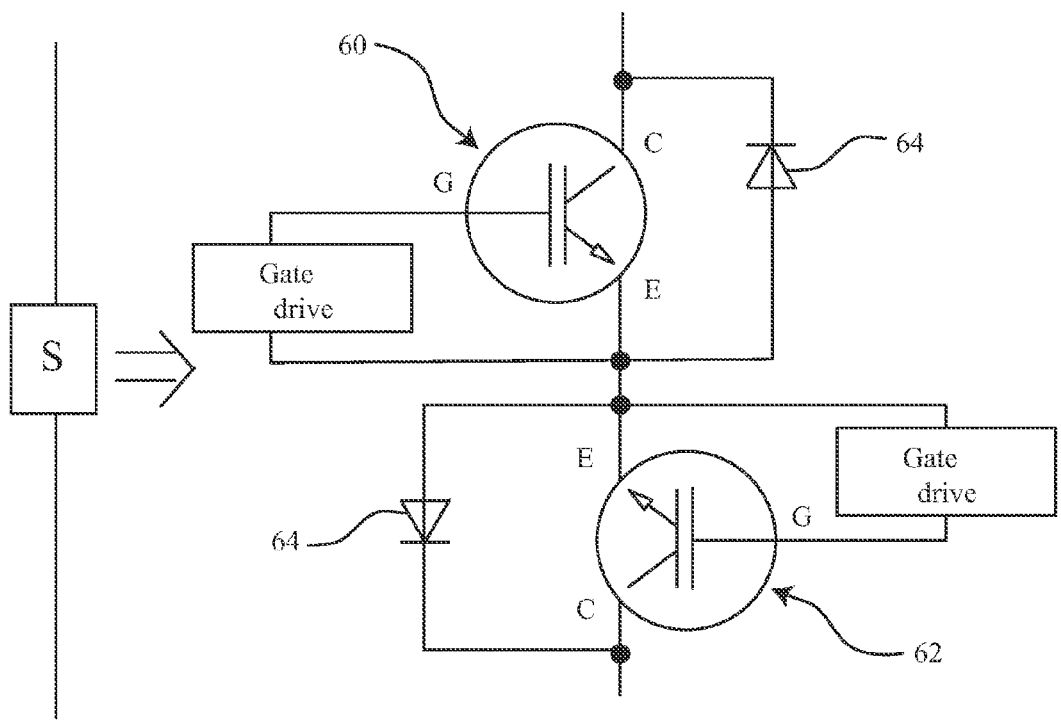
FIG. 8B is a schematic diagram of a IGBT bidirectional switch.
Figure 9A:
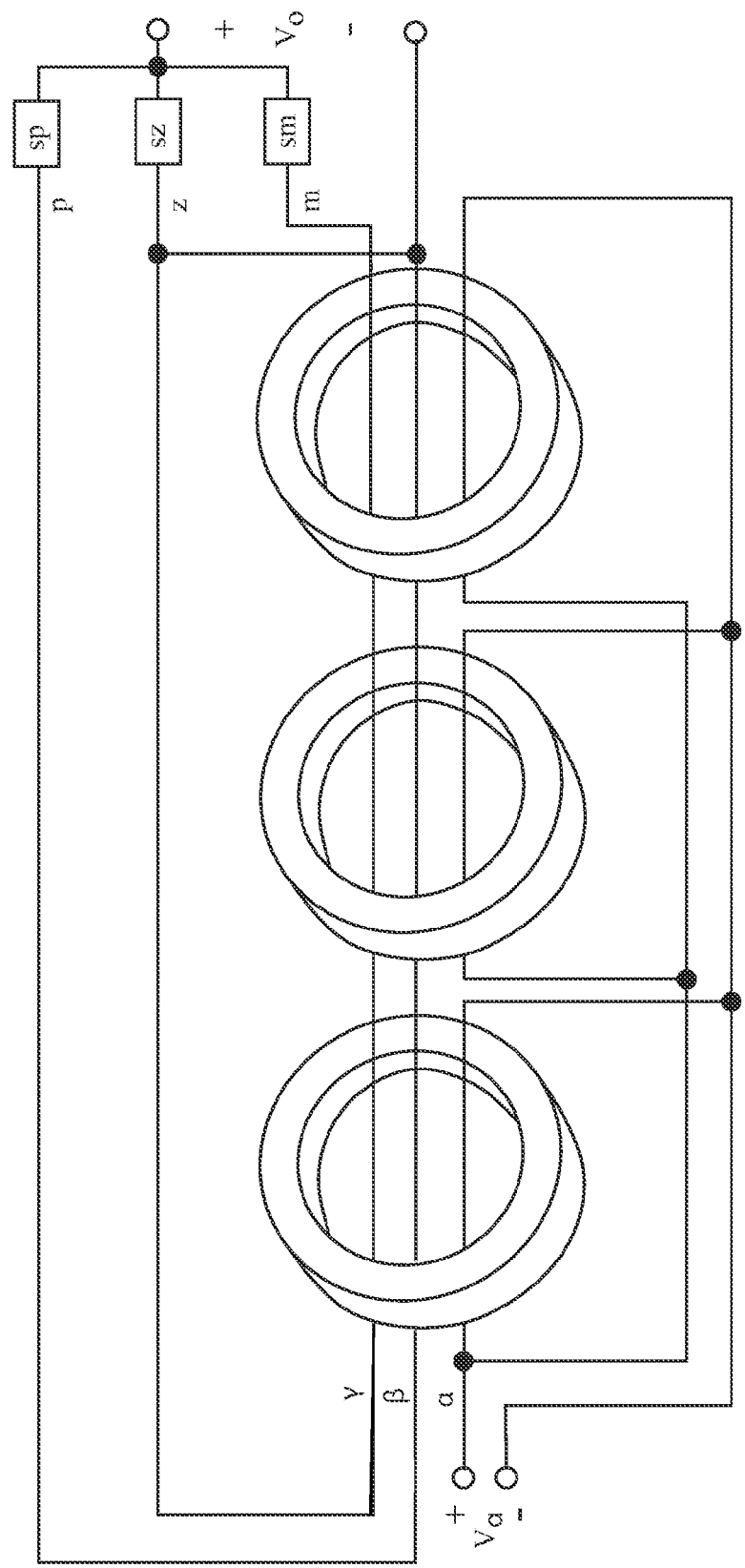
FIG. 9A is a physical representation of Magistor 3U module.
Figure 9B:
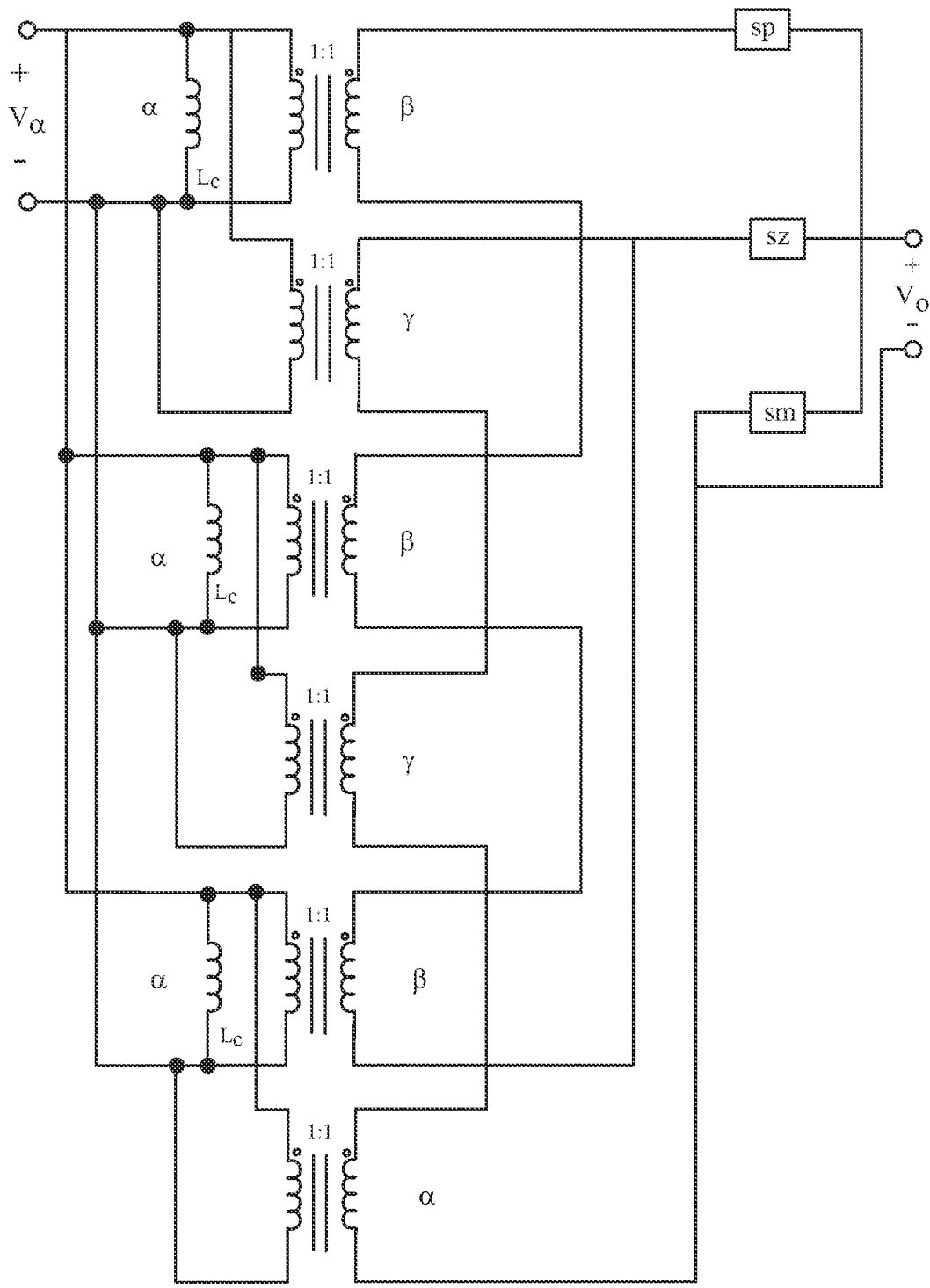
FIG. 9B is an electrical schematic of the Magistor 3U module of FIG. 9A.
Figure 10:
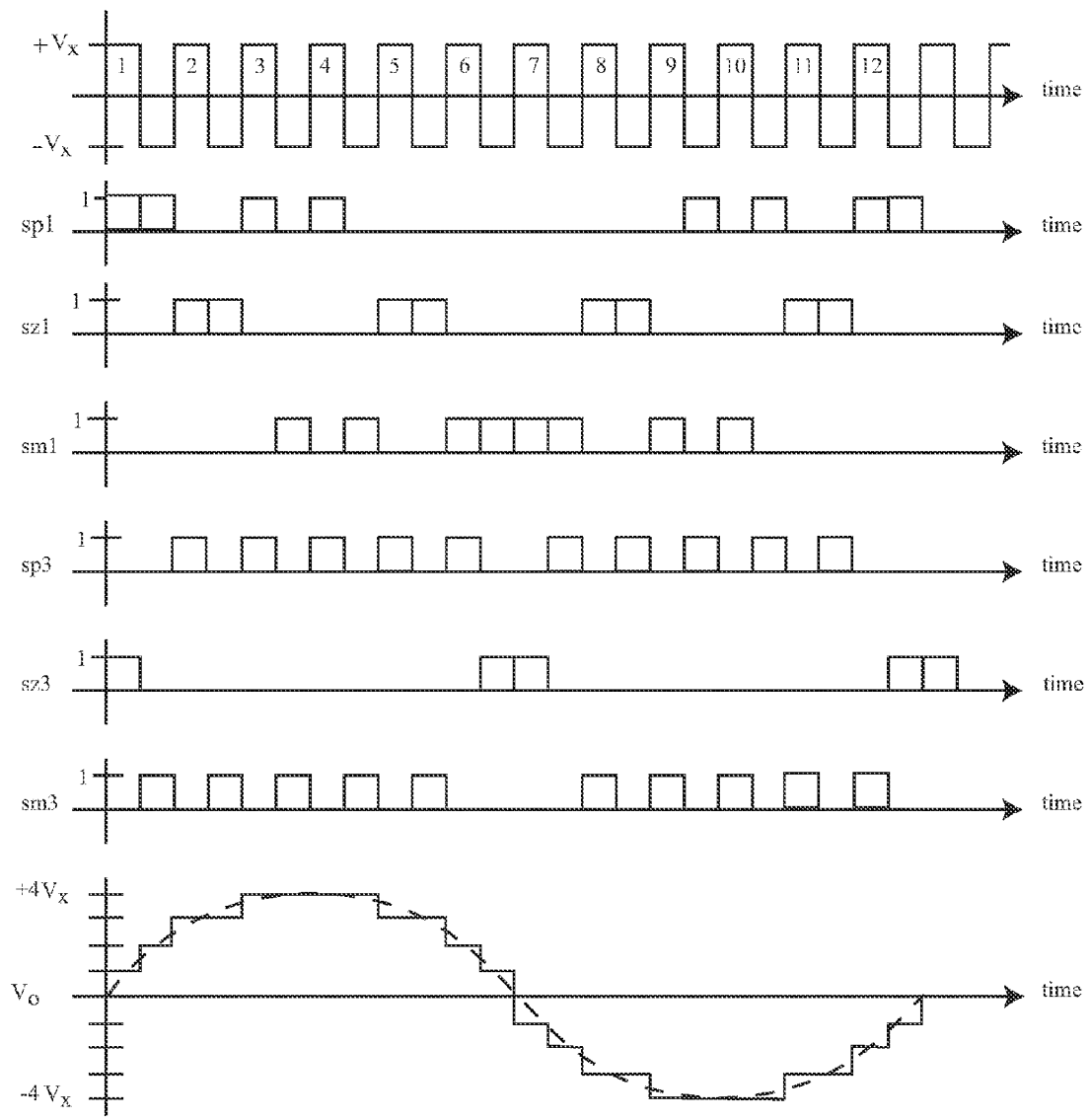
FIG. 10 is a trace set representing voltage input, switching control and voltage output for a combined Magistor 1U module and Magistor 3U module providing a step wise approximation to a sine wave with amplitude of 4Vx and frequency of f/2.

For the embodiments shown each DC/AC converter is based on a MOSFET, full bridge, square wave drive circuit. The 1U and 3U transformer subsystems are as depicted in FIGS. 3 and 9, respectively, with each 1U core structure sized to support at least 40 to 50 peak volts of square wave excitation/drive at a switching frequency in the 20 to 50 kHz range. For example embodiments, the bidirectional switches are MOSFETs for the 1U modules and IGBTs or MOSFETs for the 3U module.

Although the example embodiments described above for the AC battery concept have all been for fixed frequency, fixed voltage systems, the AC battery system is not limited in this regard, nor to this application area. Step-wise and PWM waveform synthesis is inherently variable voltage and variable frequency capable. The controlled AC output of an AC battery system, particularly when connected in three (or higher) phase configurations can be employed to drive and control AC motors and alternators in a straightforward manner. For example, in an electric vehicle, or hybrid electric vehicle, with AC battery energy storage, there is no need for dedicated power electronics for traction motor control. Use of high speed digital processors in the switch controllers in the AC battery systems, which control the AC bidirectional switches, could easily handle the extra computational loading required to control the motor output. When an electric vehicle is parked, the AC battery module AC connections can easily be reconfigured to match the nature of the near-by AC grid (single phase 120 or 240 VAC, three phase 208, 240 or 480 VAC). The internal AC battery processors can then manage the battery charging or discharging (if the vehicle is feeding or supporting the local grid). No additional or outside power electronic controllers would be required.

It should be noted that, for reasons of ease of explanation, the descriptions of the step-wise synthesis of the Magistor module output sinusoidal AC waveforms given thus far (for example those given in FIGS. 4, 5, 7, 10, 11b, and 12) all assume idealized operation of the module transformer and switching device elements. Real transformers however have finite values of winding leakage inductance, which limit the time rate of change of terminal currents. And real power electronic switching devices, MOSFETs, IGBTs, and associated power diodes, all have finite requirements for, as well as limitations on, the amount of terminal current flow that adds or removes internal electric charges needed to attain either a low impedance "on-state" or a high impedance, voltage blocking "off-state." These real element switching attributes of the transformer and switching devices used in a Magistor module would then preclude production of ideal, square-wave like waveforms in practical implementations of AC Battery devices. But if precise control is maintained in the detailed order and the timing of the switching sequences used in the control of the switching devices in a Magistor module near ideal and efficient operation of AC Battery devices may be approached.

The limitations and use of real switching devices in the circuitry on the DC side of the Magistor transformers in an AC Battery system lead to only slight efficiency penalties and no basic fundamental problem, given that the switching converter circuits used are well established in the art. It can safely be asserted that precise and efficient control of the DC side buck-boost DC/DC switching converters and square-wave full bridge converters are "standard practice" in the power electronic community. As a particular example, the details of precise timing control and efficient operation of a full wave bridge converter, of the type used in an AC Battery system, resulting in attainment of a near perfect 50% duty cycle, fast transition time, balanced square drive, using power MOSFETs as the switching elements, have been given by Sanjay Havanur in his publication "Optimum Dead Time Selection in ZVS Topologies," in the trade journal *Power Electronics*, dated Jun. 7, 2012.

The consequences and limitations due to the use of real components in the remainder of the AC Battery circuitry must, however, be addressed. The combination of a single Magistor transformer and the bidirectional switching network with switching devices sp, sz and sm, such as given in FIG. 3B, can be thought of as a particular form of a high frequency link, half wave, single phase cycloconverter. Circuits of this general description have been advanced by many investigators over the years ever since the development of solid-state high speed switching devices, but none in the exact format or in detailed operation as given here. Two of the closest systems in description and operation to the base Magistor module used in an AC Battery system that have been identified are that of Beristain et al, "A New Single-Phase HF-Link Multilevel Inverter," published in the Proceedings of the IEEE 36th Power Electronics Specialist Conference, June 2005; and Salam et al, "Analysis and Design of a Bidirectional Cycloconverter-Type High Frequency Link Inverter with Natural Commutated Phase Angle Control," published in the Korean Institute of Power Electronics "Journal of Power Electronics," Vol. 11, No. 5, 2011. Neither of these referenced high frequency link cycloconverter like systems used tertiary counting module output combinations to achieve multilevel AC outputs and only the system of Salem et al used full natural commutation (to be described below) of the bidirectional switches in all switching operations.

Figure 17:
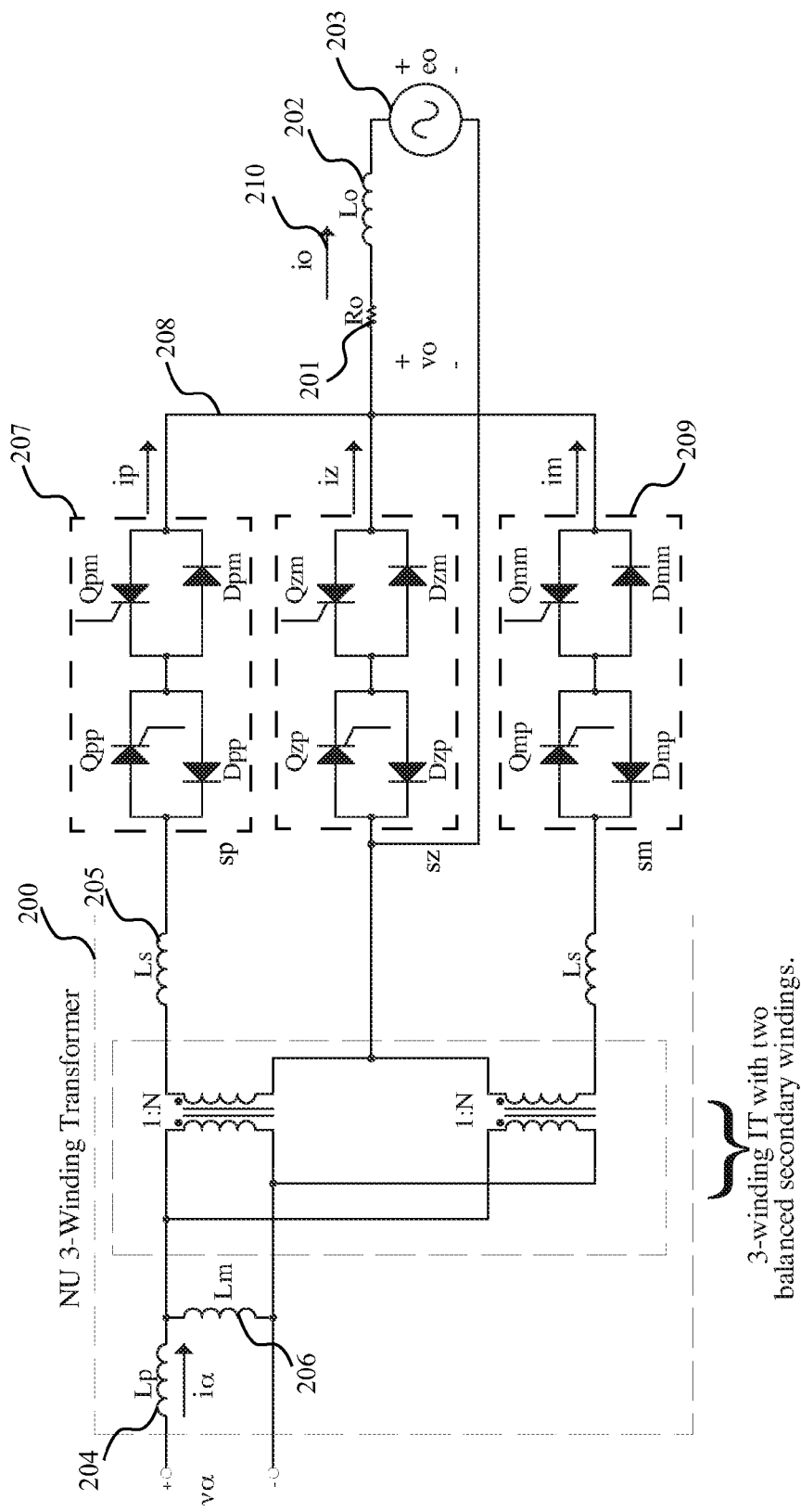
FIG. 17 is an electrical schematic of a Magistor NU converter showing the electrical elements of the transformer stage and the switch elements of the bidirectional switch array.

The detailed implementation of the bidirectional switch elements on the AC network side of a particular Magistor module NU transformer 200 in an AC Battery system, where N is the tertiary order N=$3^0$, $3^1$, $3^2$, . . . , is given in FIG. 17. The AC network load in FIG. 17 is shown as a series combination of: a resistive element Ro 201 to represent network conduction losses, an inductor element Lo 202 to represent the inductive nature of most all single phase AC networks, and a sinusoidal voltage source eo 203, whose fundamental frequency of variation is very low in comparison to the switching frequency of the square-wave source feeding the DC of the transformer. Also shown in FIG. 17 are the transformer non ideal elements for winding leakage inductances Lp 204, and Ls 205 and the transformer core magnetizing inductance Lm 206. Resistive loss elements for the windings and the core are not given and can be neglected in considering the high frequency switching operation of the transformer. Also shown in FIG. 17 are the actual device make-ups of the leg switches sp 207, sz 208 and sm 209. The generic device name "Q" is used to represent a gate controlled, turn-off and turn-on device, such as a MOSFET or an IGBT, and the name "D" is used for a physical power diode as would be present as a "wheeling diode" in an IGBT packaged device, or as is naturally present as the "body diode" in a power MOSFET structure. The various subscripts on the Q and D devices indicate where in the network they are located, in the p, z, or m legs, and in the plus p, or minus m, reference direction of current flow in a given leg. Specific operation and sequencing of the various switching elements is dependent on which instantaneous "sign" Quadrant describes the AC load current io 210 and the time period average of load output voltage vo 211, denoted by avg(vo), where this time average is taken over a half cycle of the high frequency square wave generated by the DC side DC/AC square wave converter. The load is described as being in Quadrant 1 when io>0 and avg(vo)>0. The load is in Quadrant 2 when io>0 but avg(vo)<0. Quadrant 3 is the case of io<0 and avg(vo)<0. And Quadrant 4 is the case of io<0 and avg(vo)>0. Operation in periods at times of Quadrant crossovers is not discussed here, but can be easily handled by use of the combined switching sequence control described below and the method of "state machine" control as given by Balog and Krein in "Commutation Technique for High-Frequency Link Cycloconverter Based on State-Machine Control," published in "IEEE Power Electronics Letters," Vol. 3, No. 3, September 2005.

Controlled switching operation of the entire network of FIG. 17 for step-wise AC output waveform synthesis can be described using two simpler, sub-networks, one for times when the load current is positive, io>0, and the other for times when the load current is negative, io<0. In either of these special cases fully one half of the switching elements can be neglected, and thus removed from consideration. If a controlled Q device is always in a blocking or off-state in the time period of interest then there is no need to consider it, nor is there need of the associated diode D which is in the same forward conduction direction and in series with the "off" Q device. If neither device conducts current, the network of FIG. 17 can then be redrawn without the presence of either component. The resulting two reduced networks derived from FIG. 17 for the special cases of io>0 and io<0 are given in FIGS. 18A and 18B, respectively. The equivalent input drive voltages e$\alpha$ 220 at the transformer side of the switching device loop circuits and the input inductances Lt 221 in series with these input drive voltages are referred to as the "Thevinen equivalent" source voltages and source inductances, respectively, and effectively account for the full network representation of the Magistor NU module (as given in FIG. 17). In all practical cases, for a Magistor module structure with very tight coupling between the winding sets, e$\alpha \approx$ N*v$\alpha$ and Lt$\approx N^2$Lp+Ls.

Figure 18A:
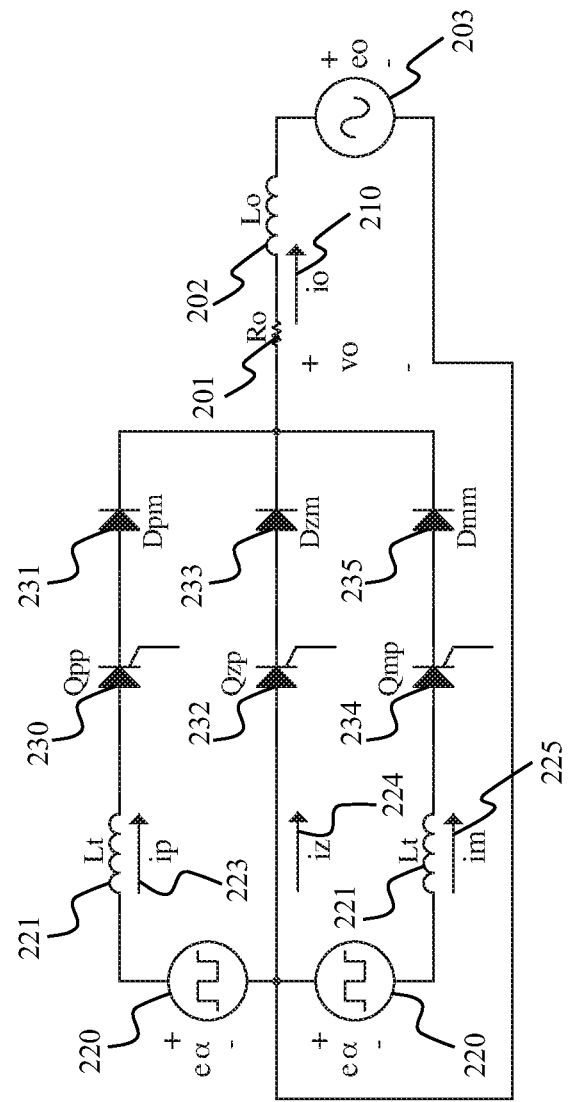
FIGS. 18A and 18B are reduced, simplified electrical schematics showing only the active elements in a Magistor NU converter for the two polarity cases of the AC output current io being positive and negative.
Figure 18B:
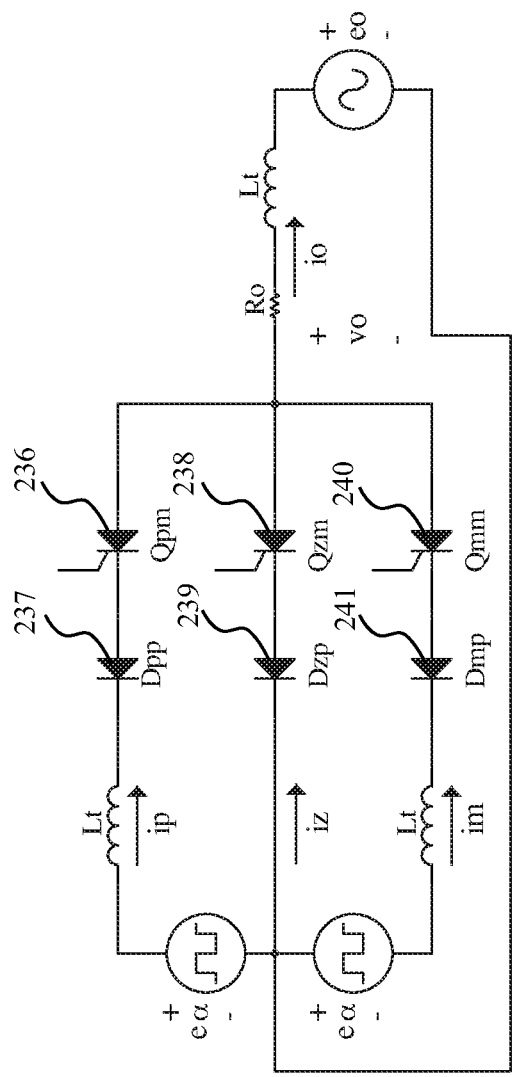

First consider PWM operation of the network of FIG. 18A, attempting to mimic ideal leading edge PWM operation as given in FIG. 11B, with the load state assumed to be in Quadrant 1, so that time average positive power is being delivered to the AC load. In general io 222 is positive but still time varying. Here however, for purposes of insight to circuit operation, io is considered to be approximately constant (quasi stationary) in comparison to the step-wise variation of the leg currents ip 223, iz 224 and im 225, and the voltages in the circuit. In steady-state operation with proper control, io would be expected to be near sinusoidal and vary at the fundamental frequency of the load voltage eo 229, so this quasi stationary approximation is appropriate. Further assume that source voltage e$\alpha$ 220 is in a positive half cycle with value N*Vx, and switching devices Qpp 230 and Dpm 231 are the only devices "on" in the leading edge portion of the PWM cycle so that current ip=io. Now as time progresses towards the point at which e$\alpha$ would transition to the negative half cycle with value –N*Vx the load current io, at some time before this transition time, dependent on the desired PWM duty cycle, must be moved or steered from the p leg to the z leg as part of the PWM cycle operation. Were the switching devices ideal and the transformer winding leakage inductance Lt 221 not present, device Qpp could be simply turned off and at the same time device Qzp 232 simply turned on. But with the presence of leakage inductance such a simultaneous operation of Qpp and Qzp is commonly referred to as a "hard" turn off or a forced commutation of device Qpp. As a result of this hard switching event the total magnetic energy stored in the transformer leakage inductance Lt at the time of the start of this switching event, equal to $io^2$Lt/2, can be shown to be absorbed within the physical structure of switch Qpp over the time period of the turn off transient (the time required for the current through Qpp to fall from an initial value of io to a zero value). This absorbed energy, absorbed in a spurt every cycle of the high frequency square-wave drive, is referred to as switching "turn off loss" and is a severe limitation due to thermal considerations on the current carrying capability of Qpp. Similar forced commutation high turn off loss behavior would be exhibited for all the p and m leg switching devices Qpp 230, Qpm 236, Qmp 234, and Qmm 240 when examined for several cycles of leading edge PWM operation in load Quadrants 1 and 3.

Figure 19A:
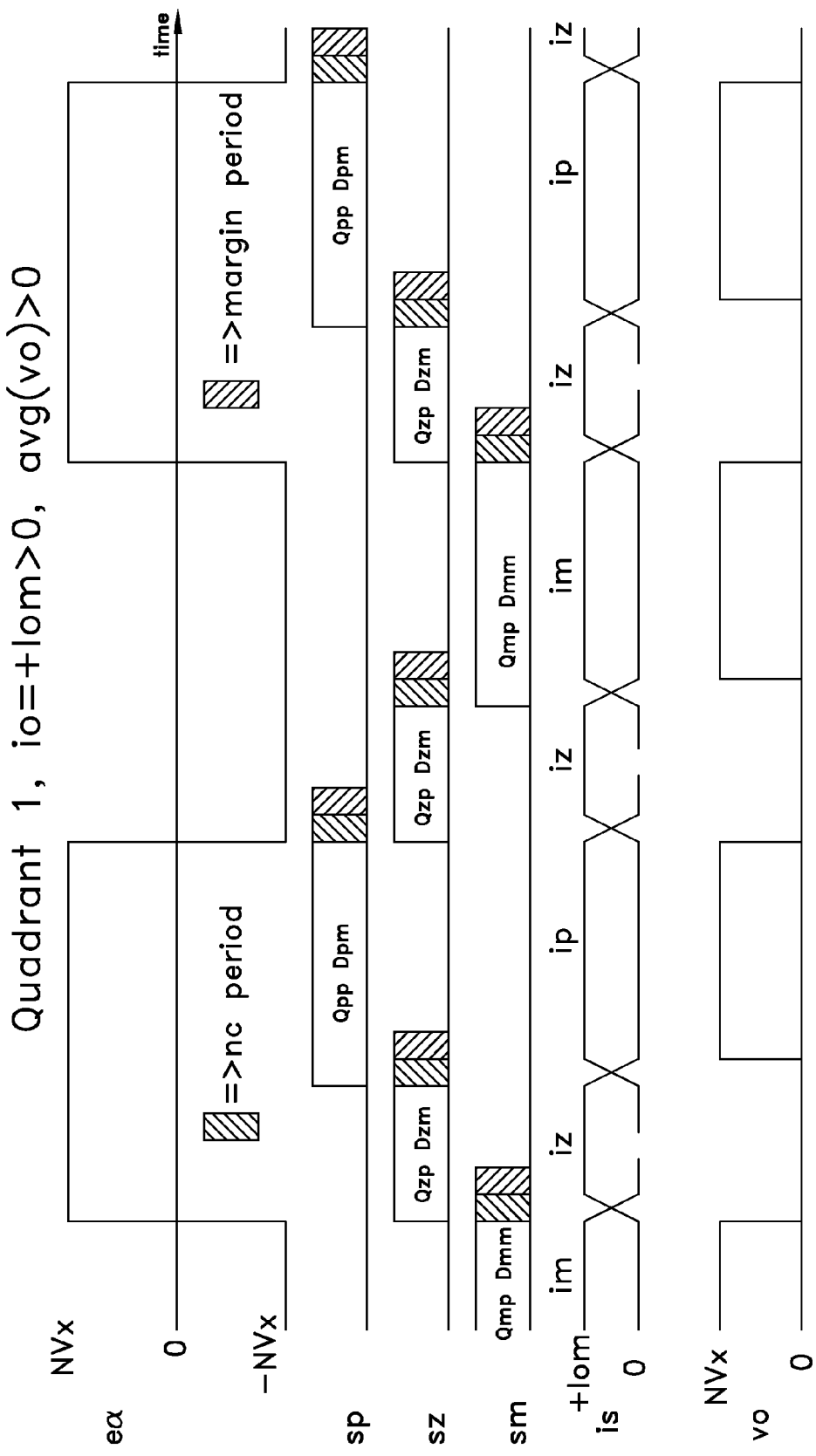

A switching sequence in load Quadrant 1 operation which avoids forced commutation in the outgoing switching device is shown in the traces given in FIG. 19A. Here trailing edge PWM operation is utilized. For example, consider the switching sequence of switches Qzp 232 and Qpp 230 when input voltage eα 220 is positive. Whenever both devices Qzp and associated diode Dzm 233 are conducting the load voltage vo 226 is shorted out and thus has zero value. This time period would then be the off period in the PWM cycle. Just before the end of this off period p leg switch Qpp is turned on. Examination of the p–z legs loop in FIG. 18A then shows that when Qpp is turned on positive current ip current will start to rise in the p leg and the two series devices Qpp and the associated diode Dpm 231. Positive current iz 224 is still flowing in the z leg but the value is now given by iz=io−ip. Since io 222 is approximately constant and ip 223 is growing linearly at the rate N*Vx/Lt (A/sec), iz is soon driven to zero and diode Dzm undergoes reverse recovery and reverts to a reverse biased, voltage blocking or off state. Switch Qzp which now has no conduction current can then be turned off safely, with no turn off transients, after a small margin time to assure that Dzm has fully recovered a reverse biased state. The process of turning on a switch in a device loop circuit and thus forcing the current to zero in a previously conducting diode in the other leg of the loop is referred to as "natural commutation." The turn off energy penalty in the switching devices is much less than in the case of forced commutation so it is a much preferred method of operation.

The next natural commutation event in the switching sequences given in FIG. 19A is that at the reverse transition, plus to minus, of the input voltage eα 220. Here the z leg switch Qzp 232 is turned on at near the same instant as the reverse transition in eα. This starts another zero voltage output portion of a PWM period, but at the same time the voltage across the series connected p leg inductance Lt 221 and the p leg devices Qpp 230 and Dpm 231 drops to −N*Vx. Thus the p leg current in diode Dpm is now driven to zero, from a starting value of io 222, in the same manner as the current in Dzm 233 was in the previous natural commutation event, and the time required for commutation is also the same. The next natural commutation event is while eα is still negative at value −N*Vx, at the end of the zero output portion of the PWM period, when diode Dzm is again commutated. In this case commutation of Dzm is initiated by the turn on of the m leg switch Qmp 234. But the situation in the lower z–m legs loop is now exactly the same as when Dzm was commutated by turn on of Qpp when eα was in a positive half cycle, so the commutation behavior is also exactly the same. Subsequently, m leg diode Dmm 235 is commutated by the turn on of Qzp at the rise transition, minus to plus, of eα, and from then on the process repeats cyclically, with each turn off of a diode device being a natural commutation. The periods of natural commutation and the associated margin periods to assure diode total reverse recovery are shown in the switch state waveforms for switches sp 207, sz 208, and sm 209 in FIG. 19A, as well as the leg currents ip, iz, and im. The PWM load voltage vo 226 is also shown. It is important to note that near 100% duty cycle output can be attained, near full positive rectification, if the z leg switches are not utilized at all. For this case the p leg switch Qpp would then be turned on near the time of the rise transition of eα and the m leg switch would then be turned on near the time of the fall transition of eα. The periods of natural commutation and margin time would still be required so exact 100% duty cycle output could not be fully attained.

As expected, full natural commutation can also be attained for all switching events for operation in load Quadrants 2, 3, and 4. The detailed switching sequences for these load cases are given in FIGS. 19B, 19C, and 19D for load Quadrants 2, 3, and 4 respectively, similar to the switching sequences for load Quadrant 1 operation given in FIG. 19A. Note that in load Quadrant 2 and 4 operation, where the average power flow is negative (from the AC load network to the DC side of the Magistor transformers), the PWM schemes revert to leading edge. Note also that for Quadrant 2 and 4 operation, the turn on times of the required p and m leg switches, which initiate the z leg diode commutations, must lead the transition times of eα by at least the time required for a natural commutation and a margin period. This is different than the case of load Quadrant 1 and 3 operation, wherein the turn on times of the z leg switches, which initiate the p and m leg diode commutations, must be coincident with, or at least very near to (but on the lag side) the transition times of eα.

The Magistor modular converters shown in FIGS. 13, 14A, 14B, and 15 enable and control electric power flow between the DC energy storage devices or sources on the left hand side of the diagrams and a single phase AC network (source or load) represented by the single phase terminal pair with AC voltage vo at the right hand side of the diagrams. Power flow control, of both the amount of power transfer and the direction (left to right: DC to AC, and right to left: AC to DC), is accomplished by controller production of sequential switching commands for the various solid-state switching devices within the functional blocks in the Magistor modules.

For example, the DC-side Converter Controller 136 takes as inputs: 1) the present "state" of the DC sources (present state of charge, present DC voltage, present DC current, present temperature, etc.); 2) signals, from the Switch Controller 129, indicating the present desired level and direction of power flow; and possibly 3) a synchronizing signal from the Switch Controller indicating the exact instants at which the various DC-side DC/AC converter AC output voltages should transition from plus to minus or minus to plus values. The Converter Controllers output signals are: 1) all the required sequential on and off firing commands for all the solid-state switching devices in the DC/DC and DC/AC converter circuits on the DC-side of the Magistor module transformers, and 2) periodic "state" reporting signals/communications back to the Master or Switch Controller 129.

The input signals required by the Switch Controller 129 are: 1) setup command and synchronization communication signals from a central or overall master controller (not shown) to indicate how this particular Magistor module is to interact and coordinate with neighboring modules such as those shown in the multi-module systems of FIG. 16; 2) AC voltage and current information at the vo interconnection terminals such that frequency and phase synchronization to the AC network can be accomplished, such as in a digital or analog phase locked loop scheme; 3) AC voltage and current information at the vo interconnection terminals such that the present state of the power flow into/from the AC network can be determined and compared to a given desired value; 4) periodic report signals from the various Converter Controllers on the DC-side of the Magistor module to enable judgment as to the present "health" of the individual DC-side source elements and if or if not the present power flow scheduling can be sustained or if it must be reduced due to failures or failings within the DC source network. The Switch Controller output signals are: 1) synchronization signals needed to convey to the various DC/AC converters on the DC-side of the module the instants at which the plus to minus and minus to plus transitions in their outputs must occur; 2) all the required sequential on and off firing commands for all the solid-state switching devices in the AC-side bidirectional switch arrays (such as those given in the switch state traces given in FIGS. 19A, 19B, 19C, and 19D); and possibly 3) periodic "state" reporting signals/communications back to the previously mentioned central or overall master controller.

Figure 19B:
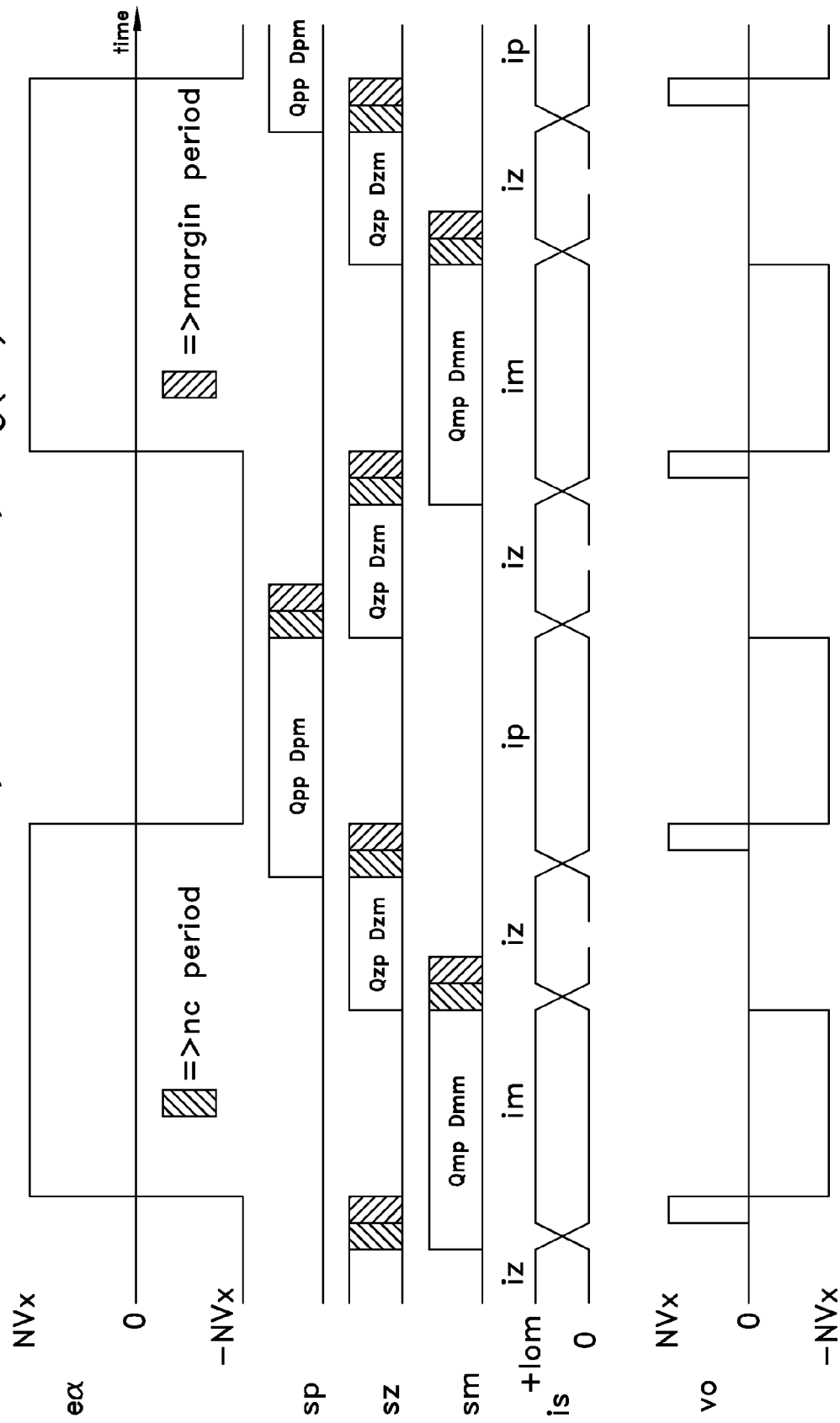
Figure 19C:
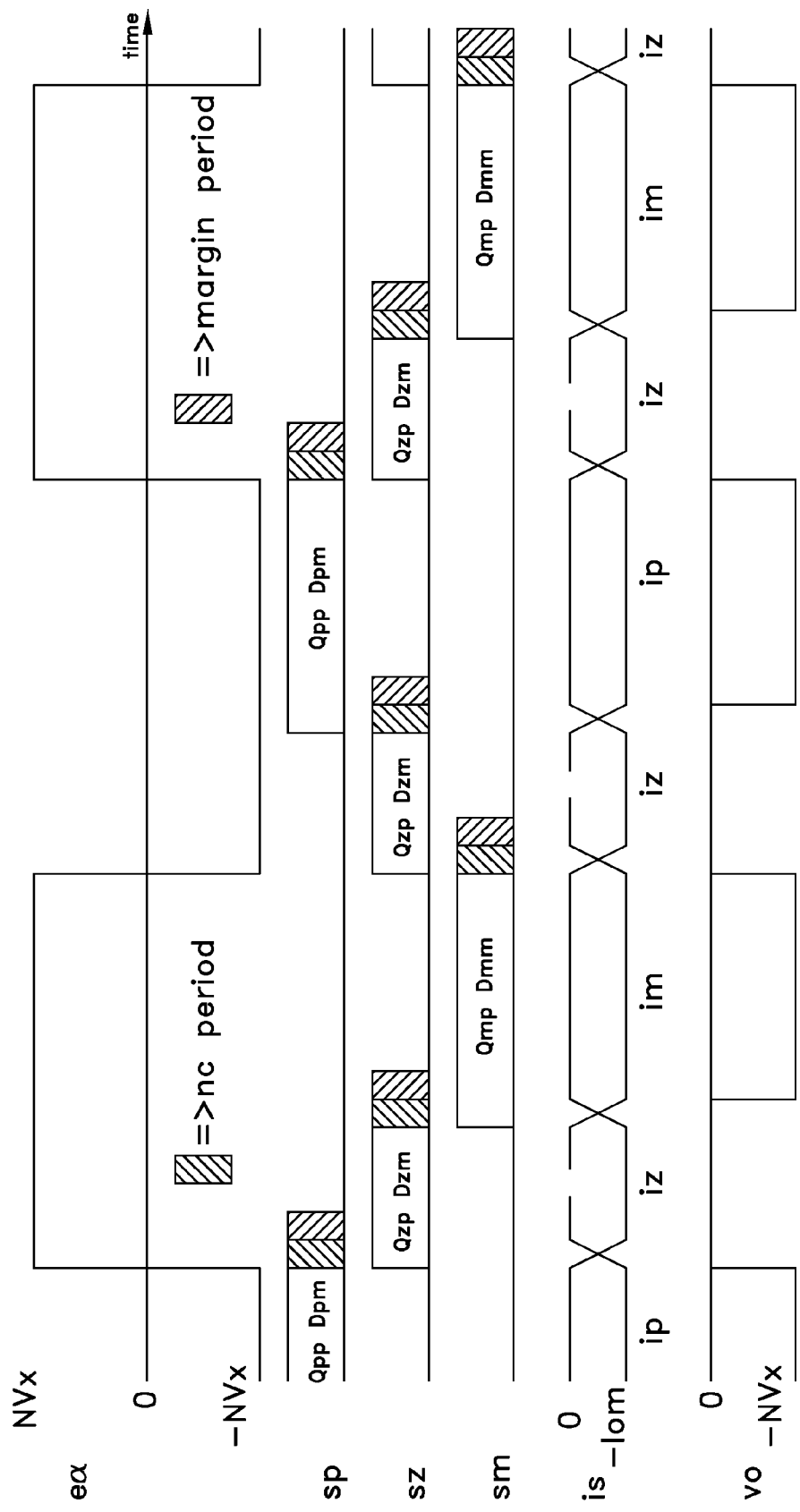

To obtain the required advance switching of Qpp to allow natural commutation of Qmp and Dmm in Quadrant 2 and 4 operation as shown in FIGS. 19B and 19D, the switch controller 129 prefires Qpp of switch sp from the trailing edge of $e_\alpha$ in Quadrant 2 operation as shown in FIG. 19B or from the leading edge of $e_\alpha$ in Quadrant 4 operation as shown in FIG. 19B based on a calculated value equal to the natural commutation period and a predetermined margin period as previously described. The prefiring of switch sp allows natural commutation of Qzp in switch sz when turned off by the switch controller at the trailing edge of $e_\alpha$ as shown in FIGS. 19B and 19D.

For near 100% duty cycle voltage output operation in load Quadrants 2, 3 and 4, as in the case for load Quadrant 1, sz switches may simply not be used at all, but the controller still allows for the needed time periods for the natural commutation and margin periods of the outgoing switching devices.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A DC/AC converter comprising: at least one module having a three winding single phase transformer using an annular core with a single turn ($\alpha$) winding, a single turn ($\gamma$) winding and a single turn ($\gamma$) winding extending through the core and having an (sp) control switch connected to the ($\beta$) winding, an (sz) control switch connected to the ($\beta$) and ($\gamma$) windings and an (sm) control switch connected to the y winding; a DC source with an AC converter connected to the a winding providing an input voltage to the at least one module, said at least one module; and, a switch controller connected to and providing pulse width modulation (PWM) activation of the (sp) control switch, (sz) control switch and (sm) control switch of the at least one module for a controlled output voltage and output current at an output of the at least one module, the switch controller operating in a first quadrant wherein average output voltage is greater than zero and output current is greater than zero, a second quadrant wherein average output voltage is less than zero and output current is greater than zero, a third quadrant wherein average output voltage is less than zero and output current is less than zero, and a fourth quadrant wherein average output voltage is greater than zero and output current is less than zero, said switch controller for first quadrant and third quadrant operation firing the (sz) control switch coincident with a transition of the input voltage and for second quadrant and fourth quadrant operation, preferring the (sp) and (sm) control switches to lead a transition of the input voltage by at least a time required for a natural commutation and a margin period in the (sz) control switch.

2. The DC/AC converter as defined in claim 1 wherein the at least one module comprises a first module having a three winding single phase transformer using an annular core with a single turn ($\alpha$) winding, a single turn ($\beta$) winding and a single turn ($\gamma$) winding extending through the core and having a (sp) control switch connected to the ($\beta$) winding, an (sz) control switch connected to the ($\beta$) and ($\gamma$) windings and an (sm) control switch connected to the ($\gamma$) winding, a second module having three interconnected three winding transformers each using an annular core with a single turn ($\alpha$) winding, a single turn ($\beta$) winding and a single turn ($\gamma$) winding extending through each core and having a second (sp) control switch connected to a first ($\beta$) winding, a second (sz) control switch connected to a third ($\beta$) and a first ($\gamma$) windings and a second (sm) control switch connected to a third ($\gamma$) winding and a third module having a three winding transformer using an annular core with a single turn ($\alpha$) winding, a single turn ($\beta$) winding and a single turn ($\gamma$) winding extending through the core and having a third (sp) control switch connected to the ($\beta$) winding, a third (sz) control switch connected to the ($\beta$) and ($\gamma$) windings and a third (sm) control switch connected to the ($\gamma$) winding, the first, second and third module connected in parallel to the AC source and in series to the output.

3. The DC/AC converter as defined in claim 2 wherein the DC source with an AC converter comprises a DC to AC square wave converter fed from a DC source.

4. The DC/AC converter as defined in claim 3 wherein the DC to AC square wave converter comprises a full bridge converter.

5. The DC/AC converter as defined in claim 2 wherein the DC source with an AC converter comprises a plurality of DC to AC square wave converters each fed from an associated DC source.

6. The DC/AC converter as defined in claim 5 wherein the associated DC sources are batteries.

7. The DC/AC converter as defined in claim 6 where each battery comprises a second plurality of lithium ion cells.

8. The DC/AC converter as defined in claim 5 further comprising a converter controller for current regulation of the DC/AC converters.

9. An AC battery comprising: a plurality of modules each having three winding single phase transformer using an annular core with a single turn a winding, ($\alpha$) single turn ($\beta$) winding and a single turn ($\gamma$) winding extending through the core and an (sp) control switch, an (sz) control switch and an (sm) control switch, each of the modules connected in series to an output; a second plurality of DC to AC square wave converters each fed from an associated battery connected in parallel to inputs of the plurality of modules; a switch controller connected to and providing pulse width modulation (PWM) activation of the (sp) control switch, (sz) control switch and (sm) control switch in each module for a controlled output voltage and output current at the output, the switch controller operating in a first quadrant wherein average output voltage is greater than zero and output current is greater than zero, a second quadrant wherein average output voltage is less than zero and output current is greater than zero, a third quadrant wherein average output voltage is less than zero and output current is less than zero, and a fourth quadrant wherein average output voltage is greater than zero and output current is less than zero, said switch controller for first quadrant and third quadrant operation firing the (sz) control switch coincident with a transition of the input voltage and for second quadrant and fourth quadrant operation, preferring the (sp) and (sm) control switches to lead a transition of the input voltage by at least a time required for a natural commutation and a margin period in the (sz) control switch.

10. The AC battery as defined in claim 9 further comprising a converter controller for current regulation of the DC/AC converters.

11. The AC battery as defined in claim 9 wherein the plurality of modules comprises a first module having a three winding single phase transformer using an annular core with a single turn ($\alpha$) winding, a single turn ($\beta$) winding and a single turn ($\gamma$) winding extending through the core and having a (sp) control switch connected to the ($\beta$) winding, an (sz) control switch connected to the ($\beta$) and ($\gamma$) windings and an (sm) control switch connected to the ($\gamma$) winding, a second module having three interconnected three winding transformers each using an annular core with a single turn ($\alpha$) winding, a single turn ($\beta$) winding and a single turn ($\gamma$) winding extending through each core and having a second (sp) control switch connected to a first ($\beta$) winding, a second (sz) control switch connected to a third ($\beta$) and a first ($\gamma$) windings and a second (sm) control switch connected to a third ($\gamma$) winding and a third module having a three winding transformer using an annular core with a single turn ($\alpha$) winding, a single turn ($\beta$) winding and a single turn ($\gamma$) winding extending through the core and having a third (sp) control switch connected to the ($\beta$) winding, a third (sz) control switch connected to the ($\beta$) and ($\gamma$) windings and a third (sm) control switch connected to the ($\gamma$) winding, connected in series.

12. A method for AC wave form generation with a plurality of modules each having a three winding single phase transformer using an annular core with a single turn ($\alpha$) winding, a single turn ($\beta$) winding and a single turn ($\gamma$) winding extending through the core and an (sp) control switch, an (sz) control switch and an (sm) control switch, said modules connected in series to an output comprising: controlling at least one of the plurality of modules for pulse width modulation of an (sp) control switch, an (sz) control switch and an (sm) control switch in a first quadrant wherein average output voltage is greater than zero and output current is greater than zero, a second quadrant wherein average output voltage is less than zero and output current is greater than zero, a third quadrant wherein average output voltage is less than zero and output current is less than zero, and a fourth quadrant wherein average output voltage is greater than zero and output current is less than zero, controlling for first quadrant and third quadrant operation by firing the (sz) control switch coincident with a transition of the input voltage and controlling for second quadrant and fourth quadrant operation by preferring the (sp) and (sm) control switches to lead a transition of the input voltage by at least a time required for a natural commutation and a margin period in the (sz) control switch; and, controlling at least a second one of the plurality of modules for discrete step wise voltage change.

13. The method for AC wave form generation as defined in claim 12 wherein the plurality of modules comprises a first module having a three winding single phase transformer using an annular core with a single turn ($\alpha$) winding, a single turn ($\beta$) winding and a single turn ($\gamma$) winding extending through the core and having a (sp) control switch connected to the ($\beta$) winding, an (sz) control switch connected to the ($\beta$) and ($\gamma$) windings and an (sm) control switch connected to the ($\gamma$) winding, a second module having three interconnected three winding transformers each using an annular core with a single turn ($\alpha$) winding, a single turn ($\beta$) winding and a single turn ($\gamma$) winding extending through each core and having a second (sp) control switch connected to a first ($\beta$) winding, a second (sz) control switch connected to a third ($\beta$) and a first ($\gamma$) windings and a second (sm) control switch connected to a third ($\gamma$) winding and a third module having a three winding transformer using an annular core with a single turn ($\alpha$) winding, a single turn ($\beta$) winding and a single turn ($\gamma$) winding extending through the core and having a third (sp) control switch connected to the ($\beta$) winding, a third (sz) control switch connected to the ($\beta$) and ($\gamma$) windings and a third (sm) control switch connected to the ($\gamma$) winding and the step of controlling at least one of the plurality of modules for pulse width modulation comprises controlling the (sp) control switch, an (sz) control switch and an (sm) control switch of the first and third modules for pulse width modulation and the at least a second one of the plurality of modules comprises the second module.

14. The method for AC wave form generation as defined in claim 12 wherein the plurality of modules has a parallel input from a second plurality of AC sources having DC to AC square wave converters each fed from an associated battery and further comprising controlling the square wave converters for regulating current.

15. The method for AC wave form generation as defined in claim 14 wherein regulating current further comprises disconnection of selected square wave converters.

* * * * *